(12) United States Patent
Dasgupta

(10) Patent No.: US 8,041,510 B2
(45) Date of Patent: Oct. 18, 2011

(54) CONTINUOUS RESERVOIR MONITORING FOR FLUID PATHWAYS USING MICROSEISMIC DATA

(75) Inventor: Shivaji N. Dasgupta, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 12/083,715

(22) PCT Filed: Nov. 2, 2006

(86) PCT No.: PCT/US2006/043181
§ 371 (c)(1),
(2), (4) Date: Aug. 12, 2009

(87) PCT Pub. No.: WO2007/056278
PCT Pub. Date: May 18, 2007

(65) Prior Publication Data
US 2009/0299637 A1    Dec. 3, 2009

(51) Int. Cl.
*G01V 1/28*    (2006.01)
(52) U.S. Cl. ............... 702/12; 702/11; 702/13; 702/14; 702/15; 702/16; 367/38; 367/47; 367/73; 166/250.01
(58) Field of Classification Search .............. 702/11, 702/12, 13, 14, 15, 16; 367/38, 73, 47; 166/250.01
See application file for complete search history.

(56) References Cited

U.S. PATENT DOCUMENTS

| | | | |
|---|---|---|---|
| 4,974,446 A | 12/1990 | Vigneaux | |
| 5,377,104 A * | 12/1994 | Sorrells et al. ................. | 702/11 |
| 5,796,678 A | 8/1998 | Pisetski | |
| 5,946,271 A | 8/1999 | Dragoset, Jr. | |
| 6,028,820 A | 2/2000 | Pisetski | |
| 6,049,508 A | 4/2000 | Deflandre | |
| 6,098,516 A * | 8/2000 | Gazonas .................. | 86/20.15 |
| 6,389,361 B1 * | 5/2002 | Geiser .................. | 702/15 |
| 6,442,489 B1 | 8/2002 | Gendelman et al. | |
| 6,498,989 B1 | 12/2002 | Pisetski et al. | |
| 6,614,717 B1 | 9/2003 | Khan et al. | |
| 6,644,402 B1 | 11/2003 | Sharma et al. | |
| 6,886,632 B2 | 5/2005 | Raghuraman et al. | |
| 6,920,083 B2 | 7/2005 | Therond et al. | |
| 6,941,227 B2 | 9/2005 | Goloshubin et al. | |
| 6,947,843 B2 * | 9/2005 | Fisher et al. .................. | 702/13 |
| 7,059,180 B2 | 6/2006 | Al-Ghamdi | |
| 7,082,993 B2 | 8/2006 | Ayoub et al. | |
| 7,127,353 B2 * | 10/2006 | Geiser .................. | 702/13 |
| 7,242,637 B2 | 7/2007 | Van Den Beuket et al. | |

(Continued)

OTHER PUBLICATIONS

Lee et al., "Principles and Applications of Microearthquake Networks," Advances in Geophysics, Supplement 2, Academic Press, New York, NY (1981), pp. 20, 70-71.

(Continued)

*Primary Examiner* — Carol Tsai
(74) *Attorney, Agent, or Firm* — Abelman, Frayne & Schwab

(57) ABSTRACT

A system and method monitor a hydrocarbon reservoir for drainage in volumetric three dimensions. Monitoring between wells is imperative for optimum reservoir management and is achieved by mapping the hydrocarbon fluid pathways in a producing reservoir. Unlike conventional 4D or time-lapse reflection seismic imaging systems that use a controlled active seismic source and records reflected seismic energy at receivers, the system and method exploit the minute vibrations, or micro-earthquakes generated in the reservoir layers that are induced by fluid movement. These microseisms are detected as the fluids move in the reservoir.

18 Claims, 16 Drawing Sheets

U.S. PATENT DOCUMENTS

| | | | |
|---|---|---|---|
| 7,355,923 | B2 | 4/2008 | Reshef et al. |
| 7,388,811 | B2 | 6/2008 | Meunier et al. |
| 7,660,199 | B2 * | 2/2010 | Drew .............................. 367/40 |
| 7,663,970 | B2 * | 2/2010 | Duncan et al. .................. 367/38 |
| 2003/0205378 | A1 | 11/2003 | Wellington et al. |
| 2005/0179436 | A1 | 8/2005 | Park |
| 2005/0201203 | A1 | 9/2005 | Goloshubin et al. |
| 2006/0023567 | A1 | 2/2006 | Uhl et al. |
| 2007/0255545 | A1 | 11/2007 | Pita et al. |
| 2007/0286023 | A1 | 12/2007 | Bull et al. |
| 2008/0004847 | A1 | 1/2008 | Bradford |
| 2008/0151691 | A1 | 6/2008 | Eisner et al. |
| 2008/0262737 | A1 | 10/2008 | Thigpen et al. |

OTHER PUBLICATIONS

Davis et al., "Induced Seismic Deformation in the Cogdell Oil Field of West Texas," Bulletin of the Seismological Society of America, vol. 79, No. 5, Oct. 1989, pp. 1477-1495.

Wills et al., "Active and passive imaging of hydraulic fractures," Geophysics: The Leading Edge of Exploration, vol. 7, No. 11, Jul. 1992, pp. 15-22.

Marsden et al., Mathematical Foundations of Elasticity, Dover Publications, New York (1983), p. 194.

Taylor et al., "Dilatant Stabilization of Subduction Earthquake Rupture into the Shallow Thrust Interface," Fall AGU 1998, http://esag.harvard.edu/taylor/Dilatancy.html (retrieved Mar. 18, 2010), pp. 1-11.

Raymer et al., "Genetic algorithm design of microseismic injection-monitoring networks in the Tengiz field," SEG Int'l Exposition and 74th Annual Meeting, Denver Colorado, Oct. 10-15, 2004, pp. 1-4.

Dasgupta, Shiv N., "When 4D seismic is not applicable: Alternative monitoring scenarios for the Arab-D reservoir in the Ghawar Field," Geophysical Prospecting, vol. 53 (2005), pp. 215-227.

Shapiro et al., "Fluid induced seismicity guided by a continental fault: Injection experiment of 2004/2005 at the German Deep Drilling Site (KTB)," Geophysical Research Letters, vol. 33, L01309, 2006, pp. 1-4.

PCT/US06/43181 International Preliminary Report on Patentability, Mar. 24, 2009, pp. 1-9.

PCT/US06/43181 International Search Report, Feb. 19, 2008, pp. 1-3.

PCT/US06/43181 Written Opinion, Feb. 19, 2008, pp. 1-4.

PCT/US09/01379 International Search Report and Written Opinion, Apr. 29, 2009, pp. 1-9.

* cited by examiner

CONTINUOUS RESERVOIR MONITORING FOR FLUID PATHWAYS USING MICROSEISMIC DATA

FIELD OF THE INVENTION

The present invention relates to continuous monitoring of fluid paths in a hydrocarbon reservoir by application of passive microseismic emissions.

BACKGROUND OF THE INVENTION

Microseisms are induced in the reservoir rock matrix due to pore pressure perturbation and geomechanical stress field relaxation as the reservoir fluids are produced and injected. The micro-earthquakes are generated because the stress field in the reservoir is anisotropic. As the in situ stresses are perturbed by reservoir production and injection activities, the resulting changes in fluid pressure create elastic failure in the rocks and cause microseismic events that are detected with special seismic sensors.

Microseisms, emanated from the reservoir, with local magnitude ($M_L$) down to a Richter value $<-1$ or even lower, are detected. Events below magnitude $-3$ are often classified as background noise. These microseisms are detected in multi-component seismic sensors with wide bandwith, over distances of 1 km. and more. Conventionally the assessment of changes in the reservoir characteristics over the production time or reservoir fluid flow monitering is achieved with measurements that were in selected wells with down hole instruments only at selected production time intervals.

The Richter local magnitude $M_L$ and seismic moment $M_0$ are computed using the formula:

$$M_L = \frac{\text{Log}_{10}(M_0 - 16)}{1.5} \quad (1)$$

where the seismic moment $M_0$ is computed using the formula from Lee, W. H. K. & Stewart, S. W., Advances in Geophysics, Supp. 2, Principles and Applications of Microearthquake Networks, (Academic Press, 1981):

$$M_0 = \frac{4\pi \rho V_S^3 W_0 R}{.85} \quad (2)$$

R is the source-receiver distance, $W_0$ is a vorticity parameter, 0.85 is the assumed radiation coefficient, $\rho$ is the bulk density of rocks, and $V_s$ is the shear wave velocity.

The present invention offers a complementary and, in the presence of suitable reservoir rock and fluid properties, an alternative tool for monitoring hydrocarbon reservoirs with time-lapse seismic using-permanent sensors, disclosed in U.S. Pat. No. 5,946,271 to Dragoset. Such inter-well monitoring is also known as four dimensional or 4D seismic that is applied for monitoring the water sweep in a reservoir, disclosed in U.S. Pat. No. 6,886,632 to Raghuraman et al.

As water replaces the hydrocarbon fluids in some reservoirs, the resulting saturation change, generates only very small alterations in compressibility and hence in the seismic acoustic properties. This is especially true in hydrocarbon reservoirs with stiff carbonate rock matrix and low compressibility fluids like oil and water. Most of the giant oil fields in the Middle East with carbonate reservoirs have such characteristics. As a result, conventional technique like 4D seismic has only marginal utility in monitoring water sweep in these reservoir settings.

Results from recent modeling studies of Arab-D reservoir in the super-giant Ghawar oil field of Saudi Arabia suggest that only small changes in the acoustic properties occur with changes in pore fluid saturation. The reservoir pore saturation changes in the reservoir are due the injected water replacing the extracted oil. The sensitivity of the resulting change in seismic signature in carbonate reservoirs like Arab-D, is extremely low and is often below the detectability of 4D seismic measurements, as described in Dasgupta, S., "When 4D Seismic is Not Applicable: Alternative Monitoring Scenarios for the Arab-D Reservoir in the Ghawar Field", Geophysical Prospecting, Vol. 53, pp. 215-227, 2005.

The application of microseismic technique, however, would be unlikely to detect reservoir pore saturation changes as oil is swept by injected water. It would instead shed light on the fluid pathways. Information on fluid encroachment paths would allow for detection of premature water breakthroughs in production wells; i.e., an early warning system.

Accurate monitoring of fluid pathways and delineating the reservoir fluid flow anisotropy optimizes the reservoir management and improves the recovery of oil from these reservoirs. These advantages could be achieved by application of microseismic emissions for detecting anomalous sweep behavior. Such monitoring would also provide an opportunity for remedial design and for optimizing the planning of production and injection well locations for field development. Accurate monitoring also increases the accuracy of reservoir simulation models.

Uniform hydrocarbon reservoir fluid fronts and drainage are rare in active fields in production operations. Reservoir characteristics and drainage patterns in most fields are often proven to be much more complex than is initially assumed and are further complicated as the production field matures. The fluid flow anisotropy is related to the heterogeneity in reservoir rocks. The existence of joints, bedding planes, faults, and fractures are common in the sedimentary rock matrix. In most reservoirs, the in-situ stress conditions due to overburden pressure keep these features closed to fluid flow. During the producing life of a hydrocarbon reservoir, physical changes such as fluid pressures result in perturbation in the in-situ stresses.

The reservoir stress-field is designed by a conjugate set of axes defined as principal stresses, with $\sigma_1$ being the maximum stress, $\sigma_3$ being the minimum stress, and $\sigma_2$ being the intermediate stress. The stress axes are mutually orthogonal to each other. In order for rock deformation to take place, the principal stress in one direction $\sigma_1$ must exceed the other two principal stresses $\sigma_2$ and $\sigma_3$. Along the zones of weakness in reservoir rocks, failure occurs that is defined by the known Mohr-Coulomb failure criterion. The increase in differential stress between the maximum and minimum stresses, or a net decrease in the effective normal stress due to the difference between normal stress and pore pressure, causes slippages or rock failure, as described in Marsden, J. E. & Hughes, T. J. R., Mathematical Foundations of Elasticity, Dover Publications, New York, 1994.

The following equation defines the Mohr-Coulomb rock failure:

$$\tau_f = \tau_0 + \sigma \tan \phi \quad (3)$$

where $\tau_0$=equilibrium stress state, $\tau_f$=shear stress at failure, $\sigma$=applied resultant stress, and $\phi$=angle of internal friction.

Such failure or shear-slippage induces microseismic activities and is caused by stress changes in reservoirs with perturbation caused by injection and production. Rock failure can be graphically visualized to occur as the differential stress is increased and the Mohr circle intersects the failure envelope. This occurs due to increase in maximum principal stress or a decrease in minimum principal stress.

Reservoir pore pressure change is a major factor in in-situ stress alteration resulting in Mohr-Coulomb failure. Effective stress alteration occurs due to pore pressure changes. Increase in pore pressure due to water injection reduce the effective strength of fractures, joints and faults below the critical shear stress, causing rock failure and thus trigger microseisms. Similarly, oil production from permeable rocks reduces the pore pressure relative to the surrounding lower permeable rocks. This causes a pore pressure gradient and local stress concentrations. Poroelastic changes due to oil production from an Arab-D reservoir concentrates the shear stresses near the reservoir edges or the water flood front. Microseismic events are expected to be concentrated above and below the reservoir.

As the reservoir stress is perturbed by fluid injection, shear slippage or rock failure occurs along the zones of weakness like fractures and faults. The shear slippage in rocks generates microseismic activity. These microseisms are detected and their source or hypocenters are located using broad bandwidth borehole sensors. For each microseismic event, it is first necessary to determine the fault plane and slip direction (i.e., the source mechanism) before investigating the source parameters.

This analysis is more difficult when only one observation well is available. If several sensors are emplaced in multiple wells and sensors that are widely distributed in space are available, generalized triangulation techniques can resolve the microseismic source locations with high accuracy. The distribution of the sensors relative to the microseismic event source location in the reservoir volume determines the efficiency of the sensor network. Optimum network design of sensor locations is derived by forward modeling and using elastic wave velocities and geomechanical properties of rock formations in the study area. The first arrival times of recorded compressional waves (P-waves) and shear waves (S-waves) and the velocities of the rock layers are used to compute source. location or hypocenter microseisms where the rock failure occurred.

Drilling multiple wells for microseismic, however, can prove uneconomical, especially for deeper reservoirs, for which the cost of drilling multiple observation wells becomes prohibitive. Instead of drilling several observation wells for detecting microseisms, in the current invention, the network design consists of a large number of multi-component sensors spatially distributed on the ground surface and cemented permanently in the vicinity of a well. In addition, multi-component sensors are cemented or clamped inside the well bore or borehole at multiple levels in a single well. Such a network provides the capability of detecting a large number of microseismic signals over a wide 3D aperture. The increased density of distributed measurements with respect to the microseismic events in the reservoir ensures that their source points or hypocenters are located accurately.

The method for locating the microseismic source has been disclosed in U.S. Pat. No. 6,049,508 to Deflandre, and U.S. Pat. No. 6,920,083 to Therond et al. Such source location techniques are implemented by identifying and classifying the first arrival time breaks and measuring arrival times of P-wave (or compressional wave) and S-wave (or shear wave).

Recorded microseismic waves consist of records of P-wave and S-wave. The amplitudes of these P-waves and S-waves are detected and the seismograms are recorded.

Also, polarization analysis is performed with hodograms or terminus of a moving vector for particle motion of the waves recorded in the three component (3C) sensors which are oriented orthogonally in the sensor package. The polarization analysis consists in measuring the spatial distribution of a 3C (right-normal basis) signal over a time window using the covariance matrix. Most of the time, the results used are the "azimuth" and the dip inclination of the distribution main direction which is defined by a vector. This analysis determines the direction of a wave's approach to the 3C sensors or detectors that are planted precisely with a known orientation. With these information and the seismic wave propagation velocities in the reservoir and overburden rocks, the distances between the sensors and the microseismic source in the reservoir are computed.

The particle motion of the P-wave defines the direction of the microseismic source from the observation point at each sensor. The plurality of three component sensors in the borehole and spatially distributed over a network on the ground surface provides a redundancy of observations for the same microseismic source. Such a network provides a mechanism for accurate determination of their location. Microseismic events can be located in space and their distribution patterns interpreted in terms of fluid conduction paths, sealing faults or homogeneous sweep. This information will provide improved reservoir management and will allow better planning for future wells.

The analysis of recorded P-wave and S-wave amplitude data from the three component sensors provides orientation and direction of the shear slippage in the reservoir as production and injection activities continues. The ratio of the measured S-wave amplitude and P-wave amplitude (S/P ratio) is computed at the microseismic source location. The detected S/P amplitude ratios are compared with predicted values based on geomechanical failure model and their spatial distribution matched using forward modeling. The data determine the rock failure mechanism and their orientation. Reservoir fluids advance preferentially in directions defined by the orientation and distribution of these failure surfaces. Consequently, the failure surface defines the pathways for preferential fluid movement in the reservoir.

From the Lee, W. H. K. & Stewart, S. W., Advances in Geophysics, Supp. 2, Principles and Applications of Microearthquake Networks, (Academic Press, 1981); and also Raymer, D. et al., "Genetic Algorithm Design of Microseismic Injection-Monitoring Networks in the Tengiz Field", SEG Technical Program Expanded Abstracts, 2000, pp. 562-565; the travel time for induced microseismic events from source to receiver involves solving a set of first-order differential equations. A network of sensors distributed spatially on the surface and at different levels in a borehole records a number of arrival times n, for P-waves and S-waves from a microseismic event with hypocenter parameters (x, y, z, t). In matrix notation, the problem of solving the following set of linear equations of condition:

$$AX=B \tag{4}$$

where A is the n×4 design matrix of partial differentials, X is a vector of four unknown hypocenter parameters (x, y, z, t) and B represents vector differences between the calculated and observed travel times arrival. The design matrix determines the efficiency of the network. For a given matrix A and a set of observations of B, the equation will solve for unknown vector X. The partial differentials define how much the hypocenter parameters will change with respect to travel times. The uncertainty will be large when small changes in travel time cause large changes in hypocenter. This provides a quantitative measure for network performance in locating a microseismic event source.

Performance of the network is evaluated by populating the reservoir volume of interest with trial locations. On this volume, 3D seismic ray trace modeling is performed between the trial locations and the designated sensor positions to produce a complete set of partial differentials. Each partial differential forms a line of the design matrix. The optimal combination of sensor locations in the network is found by solving these equations.

SUMMARY OF THE INVENTION

The present invention relates to an improved system and method of reservoir monitoring of hydrocarbon reservoir drainage in volumetric three dimensions. Monitoring between wells is imperative for optimum reservoir management and is achieved by mapping the hydrocarbon fluid pathways in a producing reservoir. Unlike conventional 4D or time-lapse reflection seismic imaging system that uses a controlled active seismic source and records reflected seismic energy at receivers, this novel system and method exploit the minute vibrations, or micro-earthquakes generated in the reservoir layers that are induced by fluid movement. These microseisms are detected as the fluids move in the reservoir.

A plurality of permanently cemented multi-component seismic sensors deployed spatially on the ground surface and in a borehole are used to continuously record passive microearthquakes or microseismic events as the fluids are produced and injected. These events are like earthquakes that result from elastic rock failure of reservoir matrix. The micro-earthquakes are caused due to shear stress release along zones of weakness in rocks. The stress release is due to perturbation caused by reservoir production and injection operations. The injection operations generate increased reservoir pore pressure which causes an increase in shear stress, affecting the stability along the planes of weakness present in reservoir rocks like joints, bedding planes, faults and fractures. Similarly, reservoir production operation or fluid withdrawal creates a pore pressure sink which also affects the stability in the zones of weakness. Seismic elastic waves from elastic failure of rocks in reservoirs are emitted at much higher frequencies than those from large earthquakes. The seismic waves from microseismic events are transmitted from the source location (or hypocenters) to remote sensors (or seismometers).

The microseisms or minute earthquakes emanating from the reservoir are detected simultaneously at a large number of multi-component seismic sensors that are deployed permanently at various levels in the borehole and over a surface area surrounding the borehole. Geophones capable of measuring artifact-free frequency response over a 10 Hz to 500 Hz frequency range are used. Physical coupling of the sensors to the formation and the accuracy of the instruments in responding to three-component ground-particle motion are critical. The seismograms recorded in the distribution sensors are all synchronized precisely in time with a Global Positioning System (GPS) clock. Computed source parameters from the microseismic emissions recorded continuously over the production-time can delineate reservoir fluid movements, injection water pathways, and water fingering. Such improved assessment of reservoir dynamic characteristics permit optimized hydrocarbon production strategies.

Accordingly, the present invention provides a system for the monitoring of hydrocarbon reservoir drainage fluids in a reservoir dimensions, with the system having a plurality of seismic sensors for detecting microseismic events as the drainage fluids are produced in the reservoir, and for generating corresponding microseismic data; and a computer for recording and processing the microseismic data, and for applying a predetermined data analysis program for determining and outputting a mapping of failure surfaces which define pathways for preferential fluid movement in the reservoir.

The plurality of seismic sensors includes: a three-dimensional spatial network having a plurality of surface 3-component seismic sensors permanently cemented below the ground surface; and a plurality of well bore 3-component seismic sensors installed permanently at various levels in a well bore to the reservoir. The microseismic events are detected simultaneously in a time synchronous mode for all of the plurality of sensors using a high precision GPS clock time measurement system. A fluid injection system performs controlled stimulation of the reservoir by cyclical injection of fluids in predetermined start-stop cycles during a calibration procedure for the plurality of seismic sensors.

The microseismic events include microseisms, being mini-earthquakes associated with the flow of the drainage fluids in the reservoir, and the computer processes the microseismic data for determining the locations of the sources of the microseisms associated with the detected microseismic events. The computer compares the detected pathways for preferential fluid movement in the reservoir with predetermined computational models of the pathways. The computer also performs microseismic event detection of compressional P-waves and shear S-waves, determines a delay time for the first arrival of the P-waves and S-waves, and determines a polarization of the P-waves and S-waves for determining the azimuthal direction thereof.

The computer can also include tomographic analysis means for generating tomograms using the velocity of the P-waves and S-waves for determining the range of the P-waves and S-waves and for imaging the resulting source locations of all detected microseismic events. The computer maps the fluid pathways for reservoir flow anisotropy over reservoir production time from the images of the source locations.

In addition, the present invention includes a method for the monitoring of hydrocarbon reservoir drainage fluids in a reservoir, with the method including the steps of: detecting microseismic events using a plurality of seismic sensors as the drainage fluids are produced in the reservoir; generating microseismic data corresponding to the detected microseismic events; recording the microseismic data using a computer; processing the microseismic data using the computer to apply a predetermined data analysis program; determining a mapping of failure surfaces which define pathways for preferential fluid movement in the reservoir; and outputting the mapping through an output device.

The method uses the plurality of seismic sensors which include a three-dimensional spatial network having: a plurality of surface 3-component seismic sensors permanently cemented below the ground surface; and a plurality of well bore 3-component seismic sensors installed permanently at various levels in a well bore to the reservoir.

The step of detecting includes the step of detecting the microseismic events simultaneously in a time synchronous mode for all of the plurality of sensors using a high precision GPS clock time measurement system.

The method also includes the steps of: performing controlled stimulation of the reservoir using a fluid injection system to cyclical inject the fluids in predetermined start-stop cycles; and calibrating the plurality of seismic sensors using the controlled stimulation of the reservoir.

The microseismic events include microseisms, being mini-earthquakes associated with the flow of the drainage fluids in the reservoir, and the method processes processing the microseismic data for determining the locations of the sources of the microseisms associated with the detected microseismic events.

The method also includes the steps of comparing the detected pathways for preferential fluid movement in the reservoir with predetermined computational models of the pathways, and can further include the steps of performing microseismic event detection of compressional P-waves and shear S-waves; determining a delay time for the first arrival of the P-waves and S-waves; and determining a polarization of the P-waves and S-waves for determining the azimuthal direction thereof.

Tomographic analysis can also be performed by the method for generating tomograms using the velocity of the P-waves and S-waves; determining the range of the P-waves and S-waves; and imaging the resulting source locations of all detected microseismic events. The method can also include mapping the fluid pathways for reservoir flow anisotropy over reservoir production time from the images of the source locations.

A method is also included for continuous monitoring of fluid paths in a hydrocarbon reservoir, including the steps of: inducing microseisms in the environment of the reservoir; detecting the microseisms using surface seismic sensors to generate surface seismic measurements; detecting the microseisms using borehole seismic sensors to generate borehole seismic measurements; comparing the surface and borehole seismic measurements to locate the microseisms; and mapping the fluid paths in the hydrocarbon reservoir from the located microseisms.

BRIEF DESCRIPTION OF THE DRAWINGS

The accompanying figures form a part of the specifications of this novel system and method. These figures illustrate several features of the invention and, along with their descriptions, explain the salient features of the present invention. The same element numbers are used for the same or similar elements in the drawings.

DETAILED DESCRIPTION OF THE INVENTION

As shown in FIGS. 1-14, the present invention advantageously provides a system and method for continuously detecting passive microseismic events or micro-earthquakes for monitoring fluid pathways in a hydrocarbon reservoir. Anisotropic fluid flow or uneven directional flow rate is commonly associated with reservoir production and injection operations. As fluids are produced from, and injected into the reservoir, microseismic events are generated due to the flow anisotropy.

Figure 1:
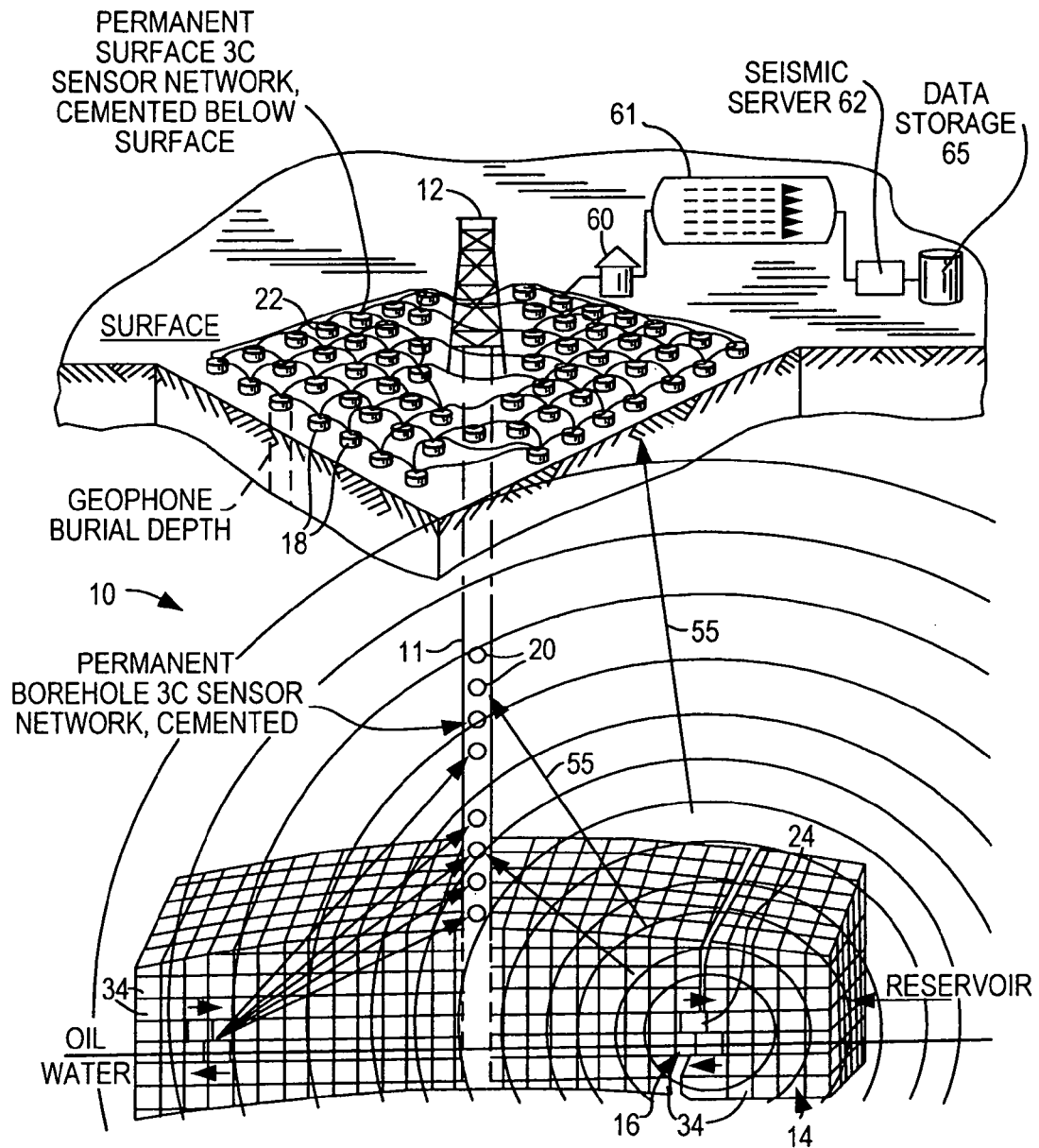
FIG. 1 is a schematic illustration of a system and method for detecting microseisms and for determining their source points in accordance with the present invention.

FIG. 1 is a schematic representation of a system 10 using the methods described herein for detecting microseisms and for determining their source points that are related to the shear slippage along zones 16 of weakness in reservoir rocks 34 of a reservoir 14. Microseismic signals emanate from the zones 16 as fluid injection and production activities cause perturbations in the reservoir 14. According to this invention, 3-component seismic sensors 18, 20 are deployed below the surface 22 and in a well bore or borehole 11 by cementing or clamping them permanently in a well 12. FIG. 1 illustrates a preferred embodiment of the instrument configuration for such a system 10. The microseismic event emissions 55 are detected by the sensors 18, 20 in the entire system 10. The emissions 55 are transmitted in spherical waves from the source location 24 as shown, which could be approximated by rays of the microseismic event emissions 55. The sensor data from the sensors 18, 20 are collected in a central unit 60 and transferred through a communications medium, such as a high speed wireless local area network employing, for example, commercially available "WIFI" devices 61 licensed by the "WIFI" Alliance. The transferred sensor data are received and recorded in a seismic server 62 for processing and for storage, for example, in a data or disk storage device 65.

The reservoir 14 with oil 30 and water 31 is idealized to be composed of a large number of small equal-size cubes. These cubes or grid blocks either contain location of shear slippage 16 with resulting microseismic activity or with no activity. When contiguous grid blocks contain microseismic events emanated from within, they are likely to be due to a system of fractures that have been temporarily or permanently displaced by the fluid flow from water injection or oil production. These cells with microseismic activities would therefore be interconnected to hydraulic flow and would constitute fluid flow pathways along these preferential directions. Grid blocks having no microseismic activity are the zones with no preferential fluid flow directions or isotropic flow. By continuously interrogating all the cells in the reservoir volume for microseismic activities in the sensors 18, 20 in the borehole 11 and those on the ground surface 22, the system 10 and method of operation can empirically determine an estimate of the flow anisotropy and fluid permeability. The network of microseismic events detected throughout the reservoir 14 using the system would form a conductivity network.

Figure 2:
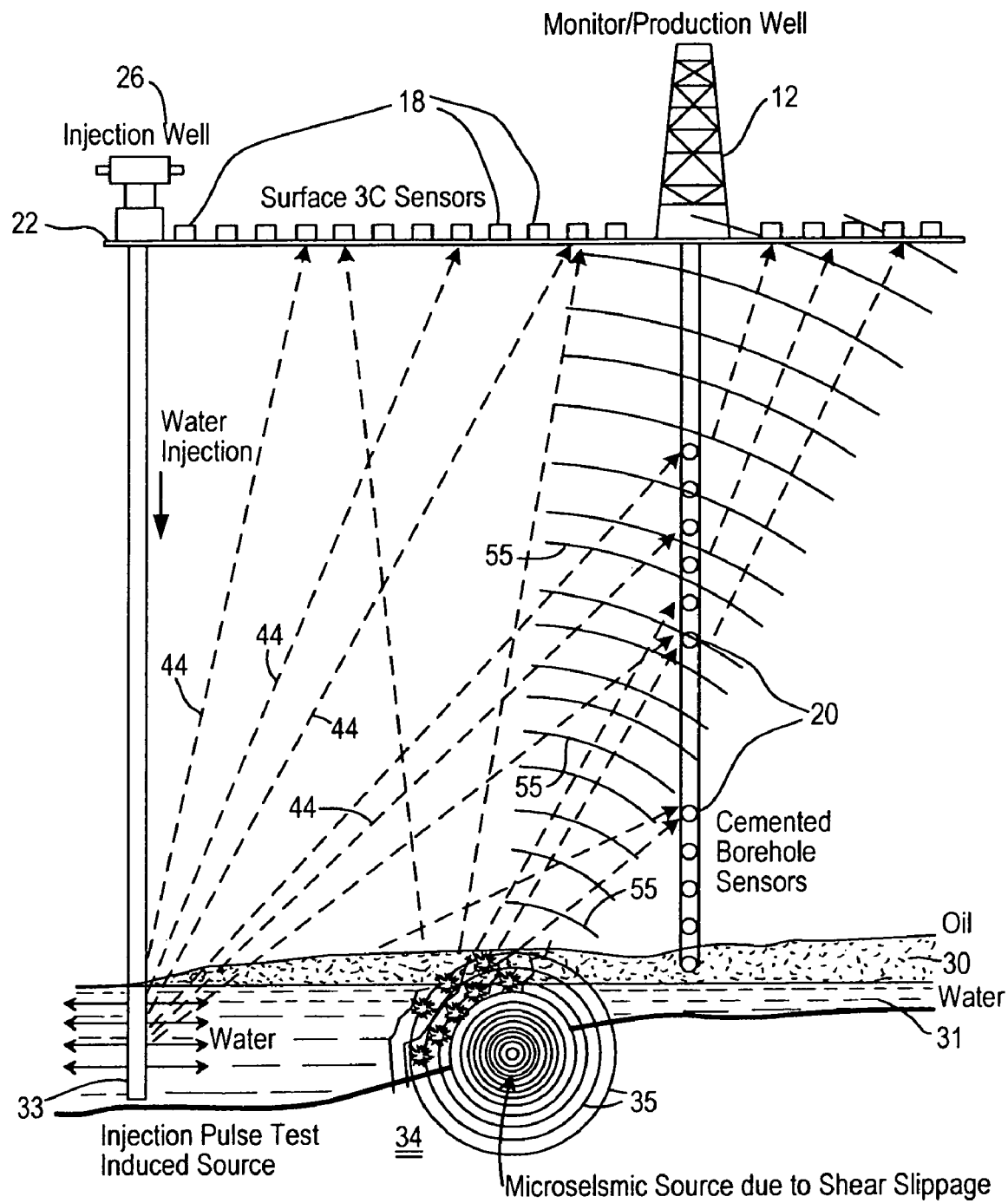
FIG. 2 is a schematic cross-sectional view of the system for performing calibration of the microseismic network.

FIG. 2 schematic cross-sectional view of the system 10 for calibration of the microseismic network. The surface 3-component sensors 18 and borehole sensors 20 detect the microseismic waves as water is injected in an injection well 26 to create an injection pulse test induced source 33 of microseisms. The well 12 is drilled and instrumented with the sensors 20, and operates to perform both monitoring and production. A controlled injection program or injection pulse test is conducted by start-and-stop injection. As pressure is increased the resulting microseismic events 44 are detected in the sensor network composed of all of the sensors 18, 20. After network calibration, the routine injection and production continues, and so the perturbations due to these activities cause elastic failure in reservoir rocks along shear zones 16 of weakness and cause microseismic events 35.

Figure 3:
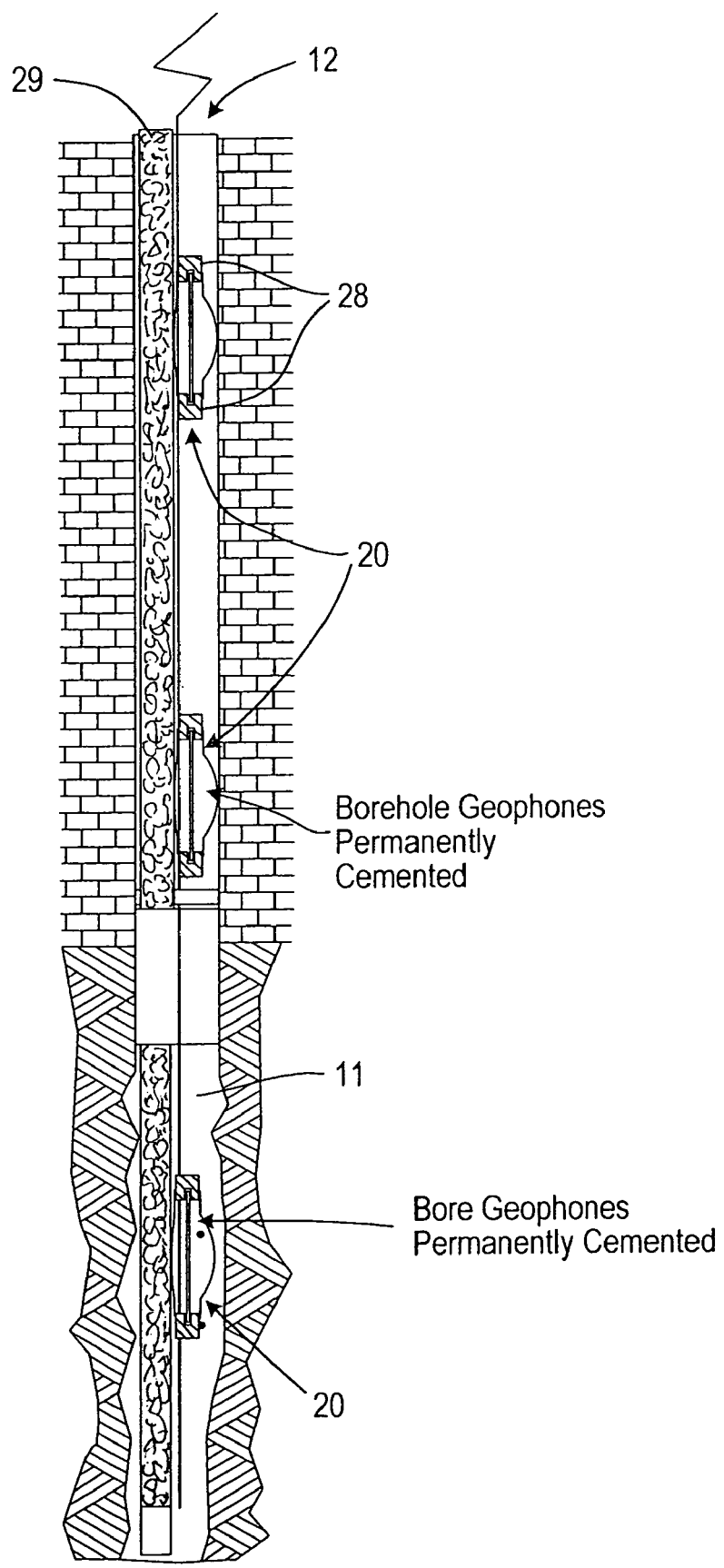
FIG. 3 is a schematic illustration of microseismic sensor installations in a borehole.
Figure 3A:
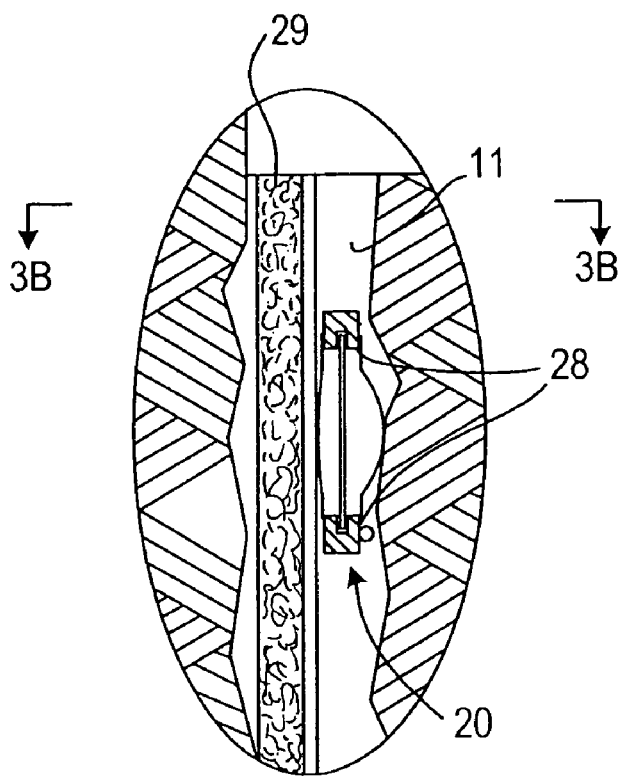
FIG. 3A is an enlarged schematic illustration of a borehole geophone shown in FIG. 3.
Figure 3B:
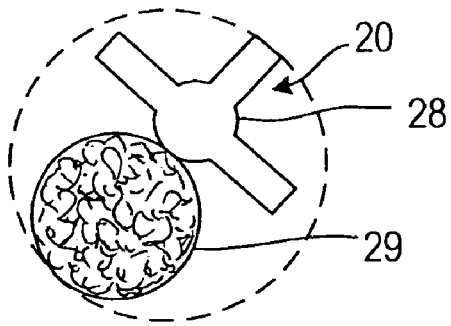
FIG. 3B is a schematic cross-sectional view of the geophone along lines 3B-3B in FIG. 3A.

FIGS. 3, 3A, and 3B illustrate a design of microseismic sensor installations in a borehole 11. The 3-component borehole sensors 20 include geophones 28 which are clamped to a tube 29 extending down into the borehole and permanently cemented in the well 12.

Figure 4:
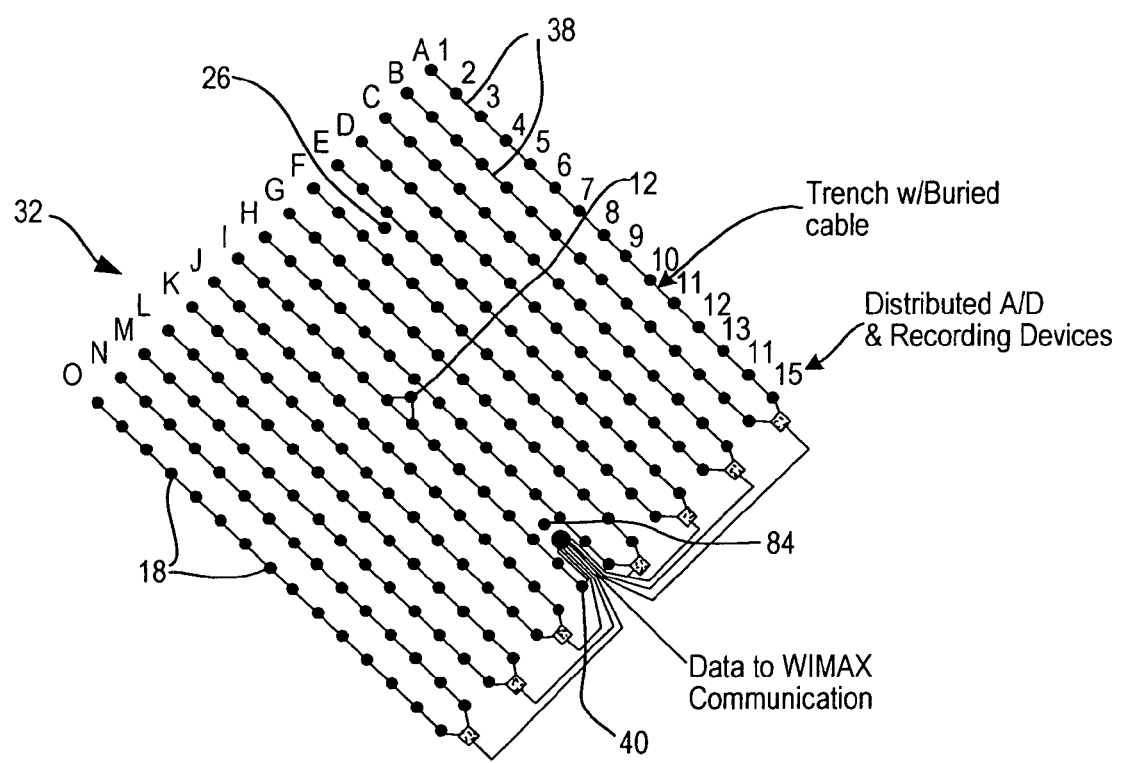
FIG. 4 is a schematic illustration of a network configuration of microseismic sensor installations buried below the ground surface.

FIG. 4 illustrates a network configuration 32 of microseismic sensor installations of ground-based sensors 18 buried below the ground surface 22. The sensors 18 are cemented, for example, in fifteen feet deep holes and are cemented with grout and bentonite mud. The connectors 38 from the sensors 18, 20 can be cables buried, for example, in two feet deep linear trenches. The surface sensors 18 can be on the surface and/or can be buried in relatively shallow depths near the surface 22, and the surface sensors 18 can be distributed analog-to-digital (A/D) detectors and recording devices. The surface sensors 18 and borehole sensors 20 are connected by the connectors 38 to a Worldwide Interoperability for Microwave Access (WIMAX) compatible communication system 40 using "WIFI" compatible devices.

Figure 5:
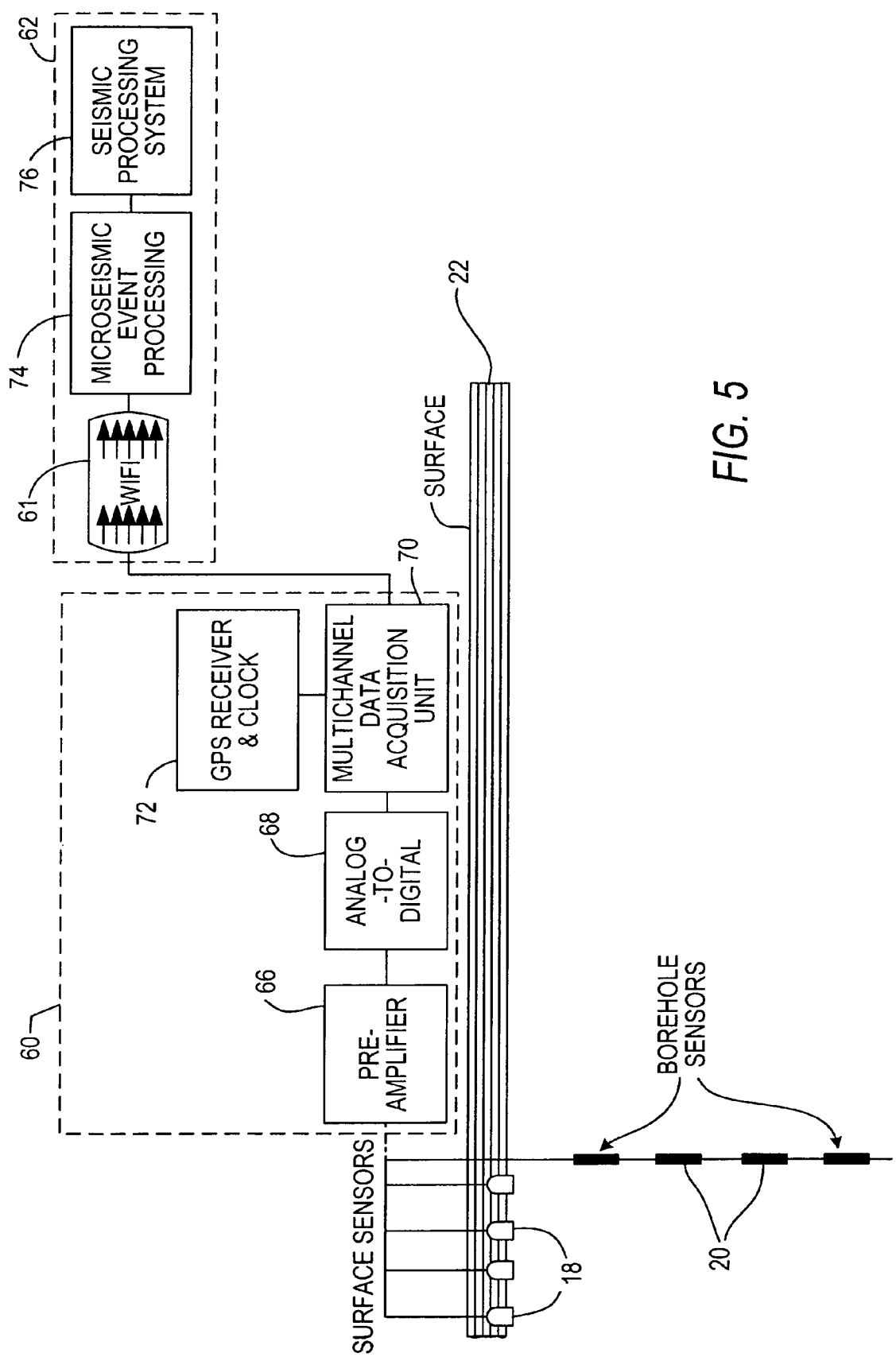
FIG. 5 is a schematic illustration of the microseismic instruments utilized in the present invention.

FIG. 5 is schematic of the microseismic instruments of the system 10 shown in greater detail. The central unit 60 can include a pre-amplifier 66, an A/D converter module 68, a multi-channel data acquisition unit 70, and a GPS receiver and clock device 72. The microseismic signals detected by the surface sensors 18 and borehole sensors 20 are amplified by the pre-amplifier 66, and digitized in the A/D converter module 68. The digital data are recorded in the multi-channel data acquisition unit 70 that also records the GPS time measured by the GPS device 72 and synchronized for all of the sensors 18, 20. Each seismic trace record includes a time stamp encoded on the data to identify the time of occurrence.

The seismic trace records, timestamped and in digital form, are transmitted by "WIFI" compatible devices 61 to the seismic server 62, which can include a microseismic event processing device 74 as well as a seismic processing system 76 for applying, for example, data analysis software and signal processing techniques, as described herein.

Figure 6:
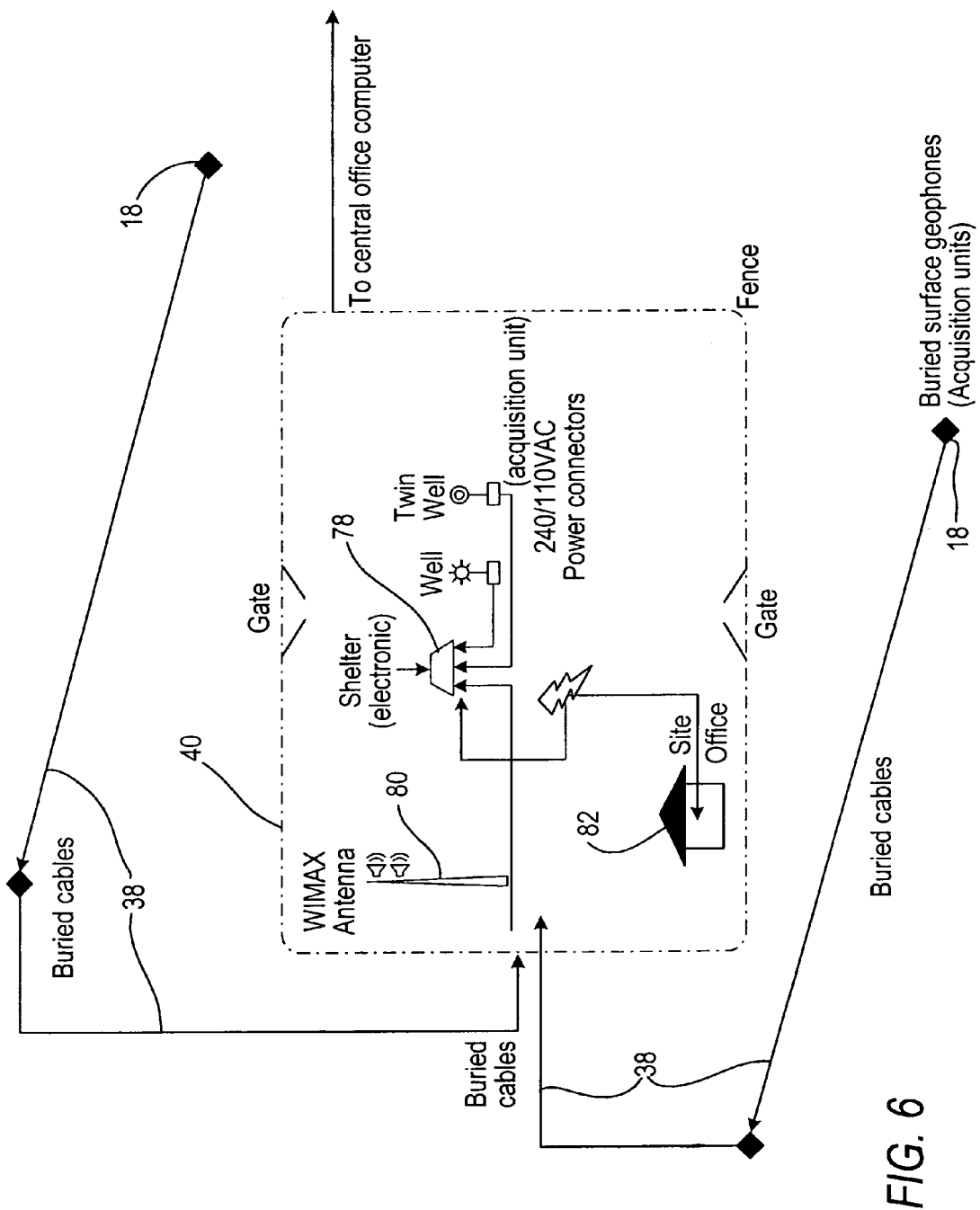
FIG. 6 is a schematic illustration of surface facilities utilized in the present invention.

FIG. 6 represents a schematic of the surface facilities in the preferred embodiment. The surface sensors 18 and the borehole sensors 20 are networked by the connectors 38 to a central electronics system 78 that is connected to the WIMAX wireless communication system 40 using "WIFI" devices.

The data are transmitted by a WIMAX antenna 80 to a central office computer of the central unit 60, and also connected to a site office 82 at the well location for data quality checks.

Figure 7:
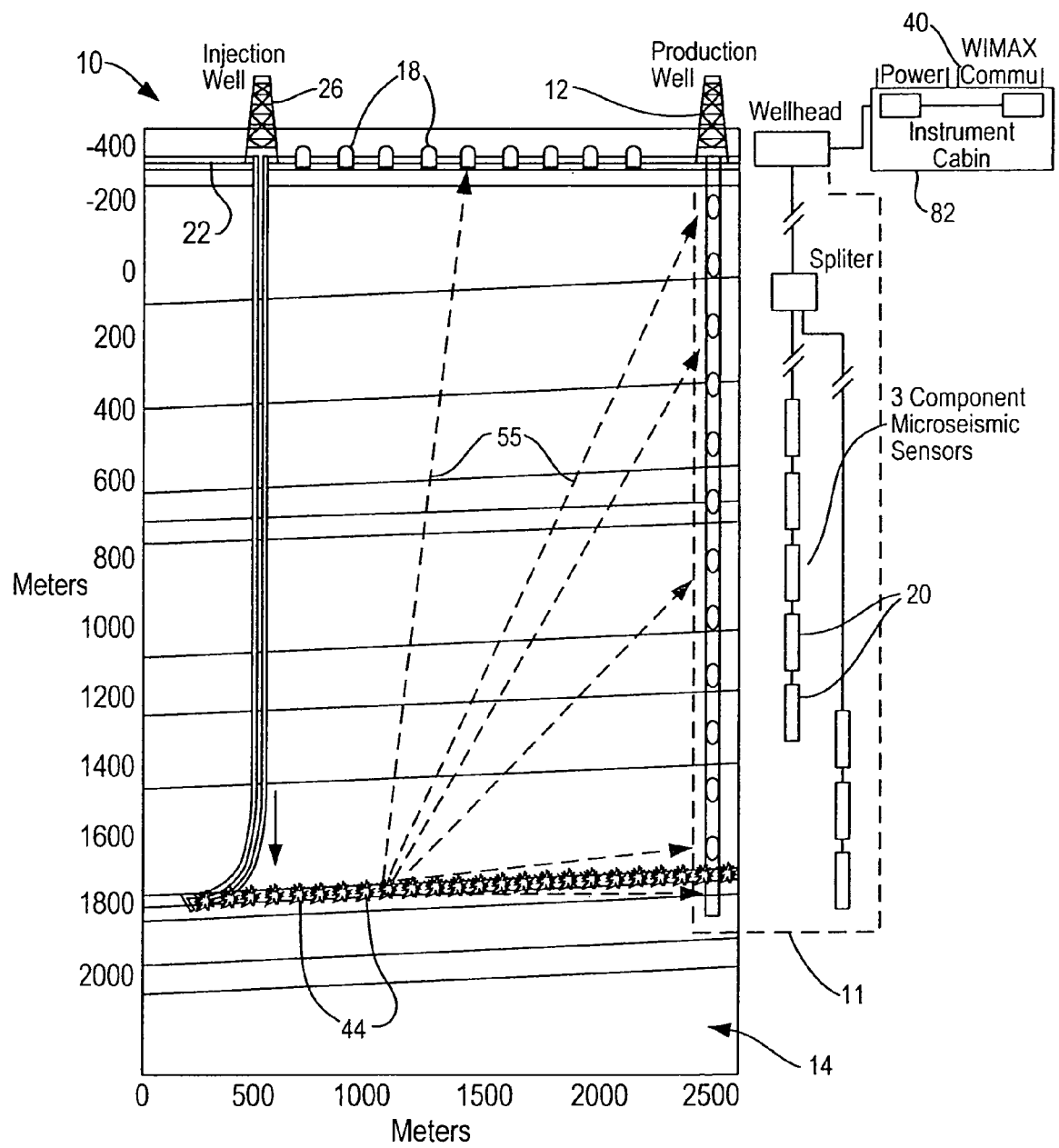
FIG. 7 is a schematic illustration of the system in operation with a reservoir.

FIG. 7 illustrates operation of the system 10 during the production life of a reservoir 14, in which shear slippage along failure surfaces occur at various times. The borehole sensors 20 are deployed in a production well 12 during operation and production of oil. The microseismic events 44 generate emissions 55 which are detected continuously in the 3-component sensors 18, 20 on the surface 22 and in the borehole 11, and which are processed by an instrument cabin of the central unit 60 for transmitting the amplified and digitized microseismic data by WIMAX communications via the antenna 80, as described in connection with FIG. 6.

Figure 8:
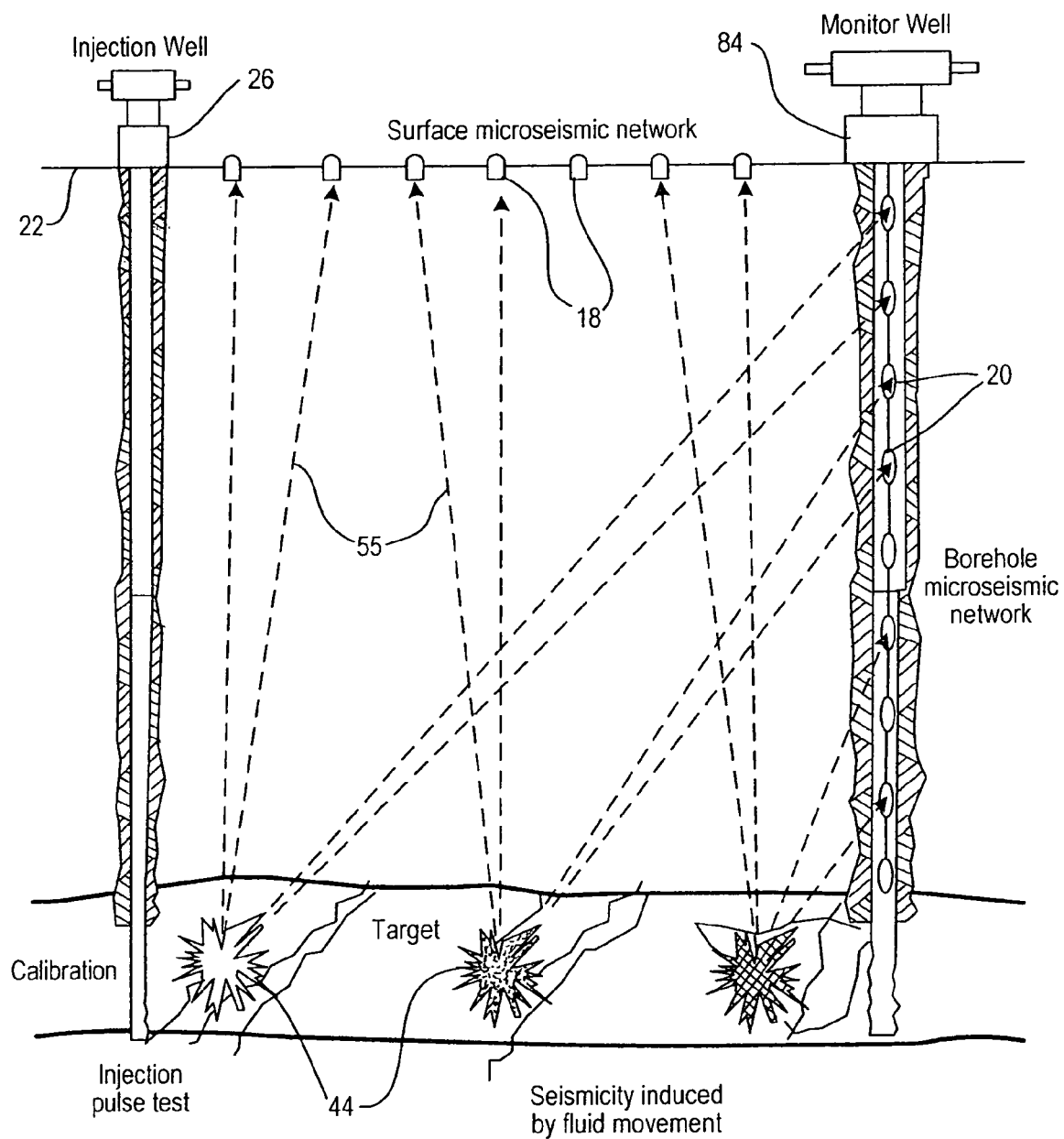
FIG. 8 is a cross-sectional view of the system of the present invention in operation.

FIG. 8 illustrates an alternative embodiment of operation of the system 10, in which the borehole sensors 20 are deployed in a dedicated monitor well 84, which can be drilled solely for monitoring, or which can be an abandoned well which is no longer used for production. With all sensors 18, 20 installed on the surface 22 and in the monitor well 84 drilled for the purpose of monitoring, microseismic events 44 are induced to calibrate or test the microseismicity in the reservoir 14 by pulsing the injection well 26 with cyclically applied water. In long term monitoring, microseismicity induced by fluid movements are continuously recorded in the sensor network of sensors 18, 20.

Figure 8A:
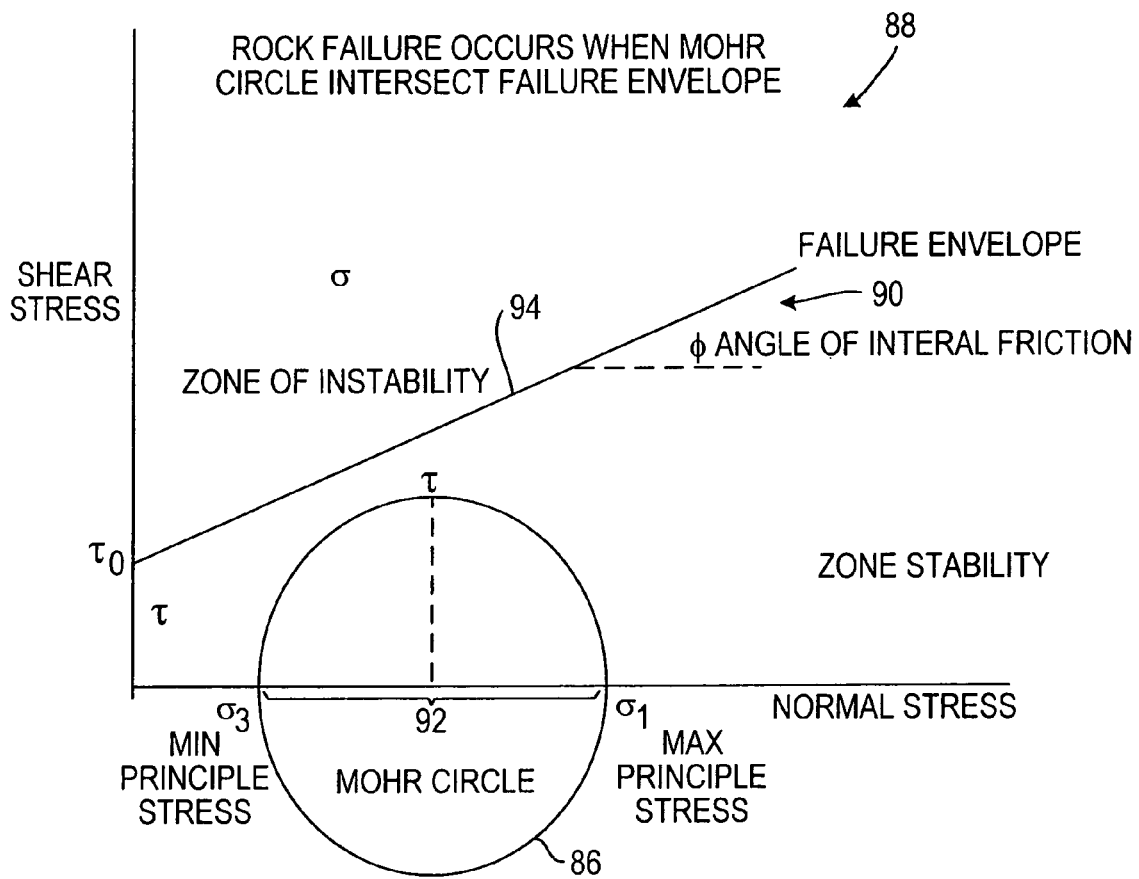
FIG. 8A is a schematic illustration of the Mohr-Coulomb rock failure criterion under triaxial differential stress.

FIG. 8A illustrates the Mohr-Coulomb rock failure criterion under triaxial differential stress. This criterion explains the source of induced microseismicity in reservoir rocks caused by stress variation due to injection and production activities. To visualize stresses on all the possible planes, a graph called the Mohr circle 86 is drawn by plotting normal stress vs. shear stress. The graph 88 defines principal stresses that will produce this combination of shear and normal stress, and the angle 90 of the plane in which this will occur. The diameter 92 of the Mohr circle 86 defines the differential normal stress between maximum and minimum stress. The strength increases linearly with increasing normal stress. The straight line 94 defines a strength/failure envelope. The angle 90 which the straight line 94 makes is the angle of internal friction or the cohesive strength of the rock matrix. When the Mohr circle 86 gets larger due to large differential stress, the Mohr circle 86 intersects the straight line 94 and induces a rock failure and associated microseisms.

The intersections of the Mohr circle 86 with the normal stress axis are $\sigma_1$ and $\sigma_3$, which are the maximum principal stress and the minimum principle stress, respectively. The intersection of the straight line 94 with the shear stress axis is $\tau_0$ which is the equilibrium stress state. The area above the straight line 94 is a zone of instability, and the area below the straight line 94 is a zone of stability.

Figure 9A:
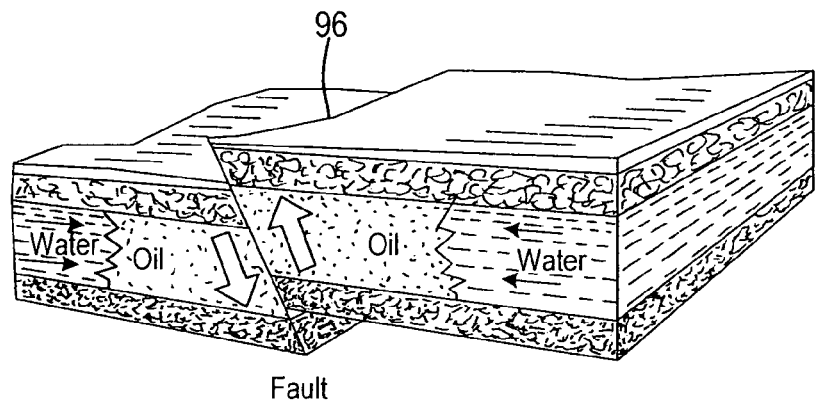
FIG. 9A is a schematic illustration of shear slippage along existing weak zones like faults, fractures and joints.
Figure 9B:
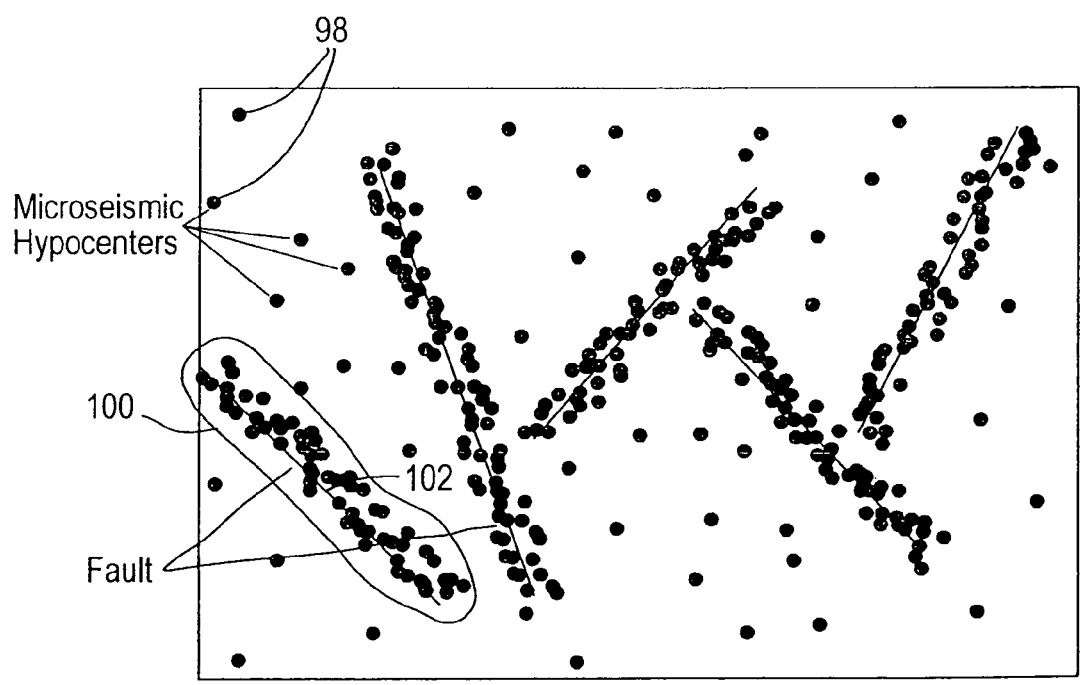
FIG. 9B is a mapping of faults determined from microseismic hypocenters using the present invention.

FIG. 9A illustrates shear slippage along existing weak zones like faults 96, fractures and joints caused by perturbation of the reservoir fluids with production and injection activities. The microseismic source locations or hypocenters 98 that are detected over the production time form linear clusters 100 along fault zones forming preferential fluid flow pathways 102, which can be mapped as shown in FIG. 9B by the system 10 and method of the present invention.

Figure 10A:
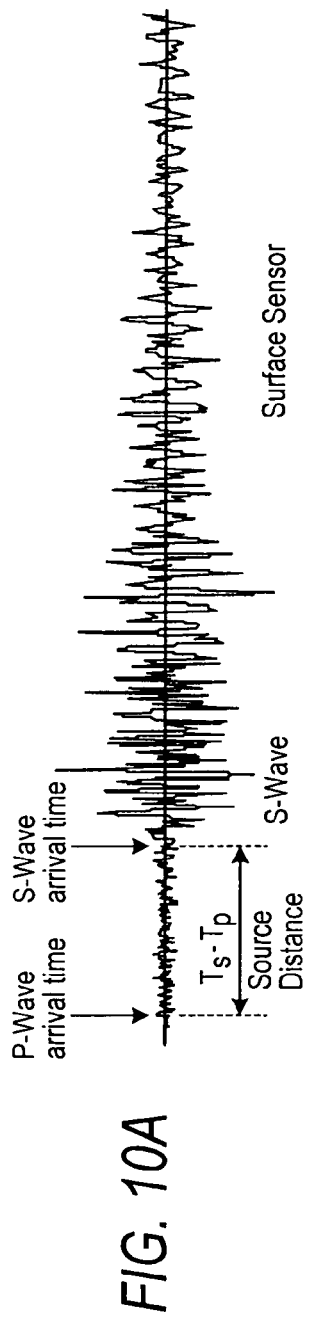
FIG. 10A is a schematic illustration of data from a surface sensor in the field.
Figure 10B:
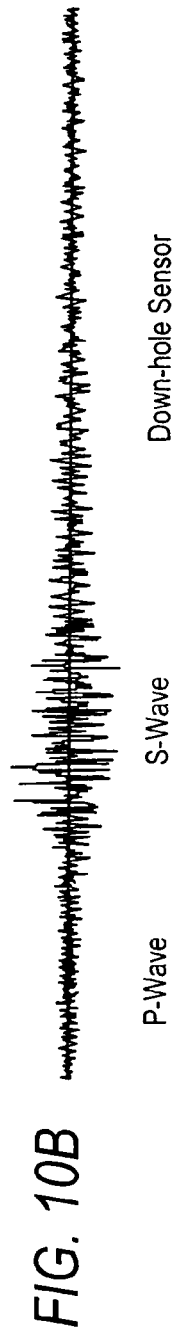
FIG. 10B is a schematic illustration of data from a downhole sensor in the field.
Figure 10C:
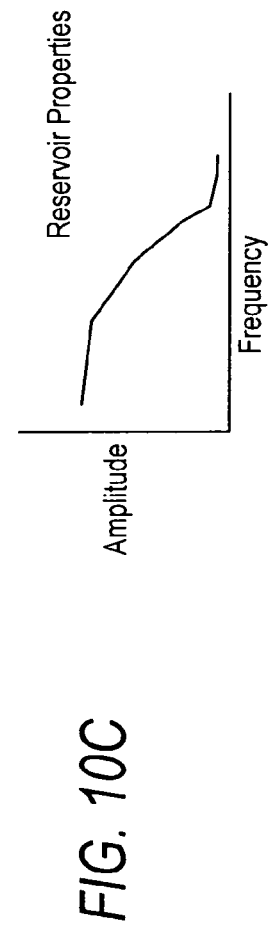
FIG. 10C is a graphic representation of data of reservoir characteristics.
Figure 10D:
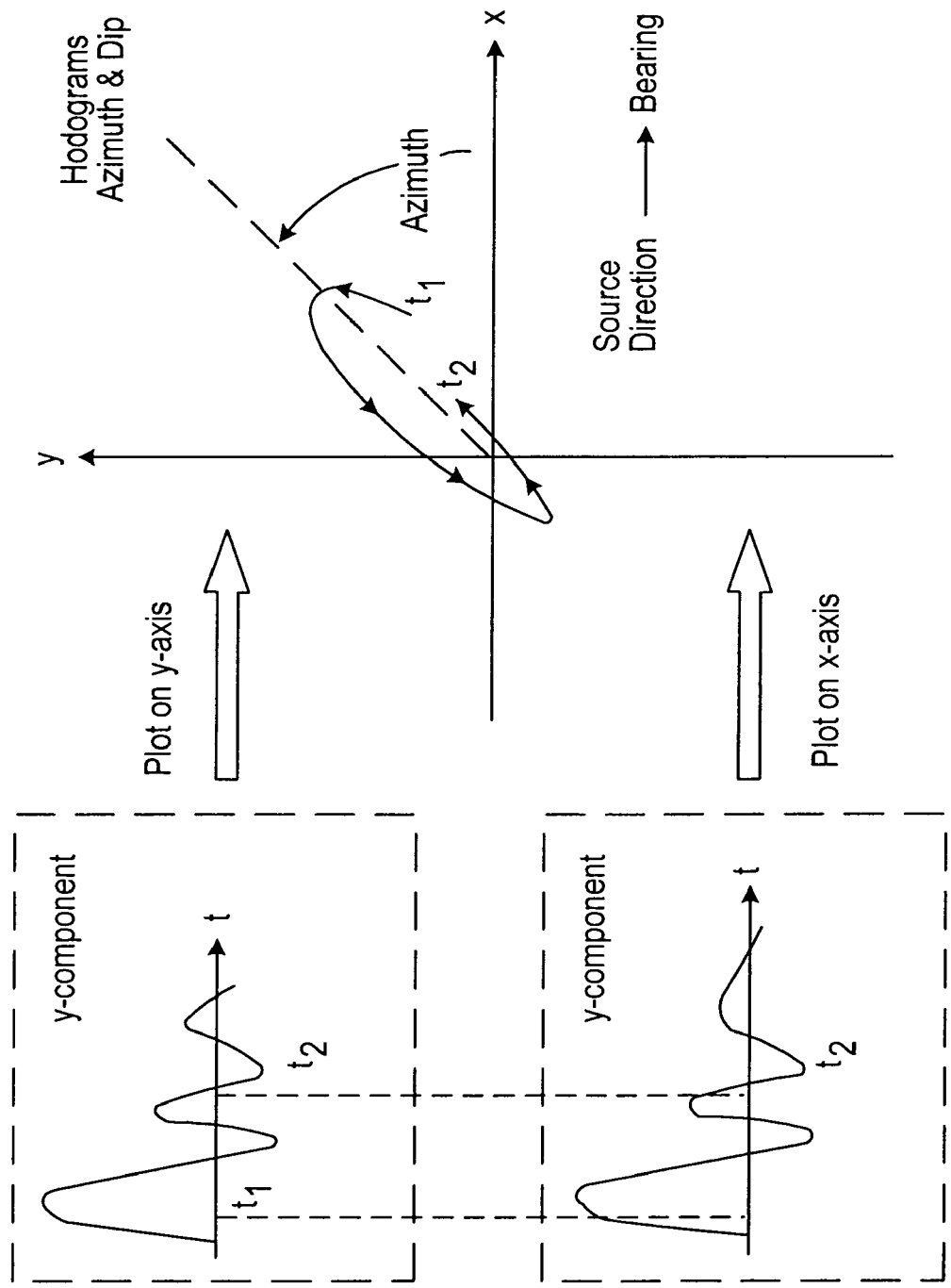
FIG. 10D is a schematic illustration of data processing of the x-components and y-components of seismic data to plot two-dimensional hodograms of the seismic data.

FIGS. 10A-10D illustrate data from a microseismic experiment conducted in Saudi Arabia. Recorded traces from a surface sensor 18 and one from a shallow borehole sensor 20 are shown in FIGS. 10A-10B, respectively, illustrating that the same microseismic event was detected in both types of sensors 18, 20. A P-wave arrives first because of its faster velocity, followed by S-waves from the same microseismic event. The first arrival time difference between S-waves and P-waves provides a measure of the source distance to the respective sensor. The polarization analysis hodograms generated by the method as shown in FIG. 10D is a measure of azimuth and dip vectors from which the direction of the source to the sensor can be inferred using, for example, the characteristic properties of the reservoir 14, shown in FIG. 10C, reflecting the relation between amplitude and frequency of the emissions 55 of the microseismic events 44, for example, as shown in FIG. 2. The x, y, z location for the microseismic event 44 is derived by known data processing methods, and the initiation time for the event is obtained from the GPS synchronous time using the GPS receiver and clock 72.

Figure 11:
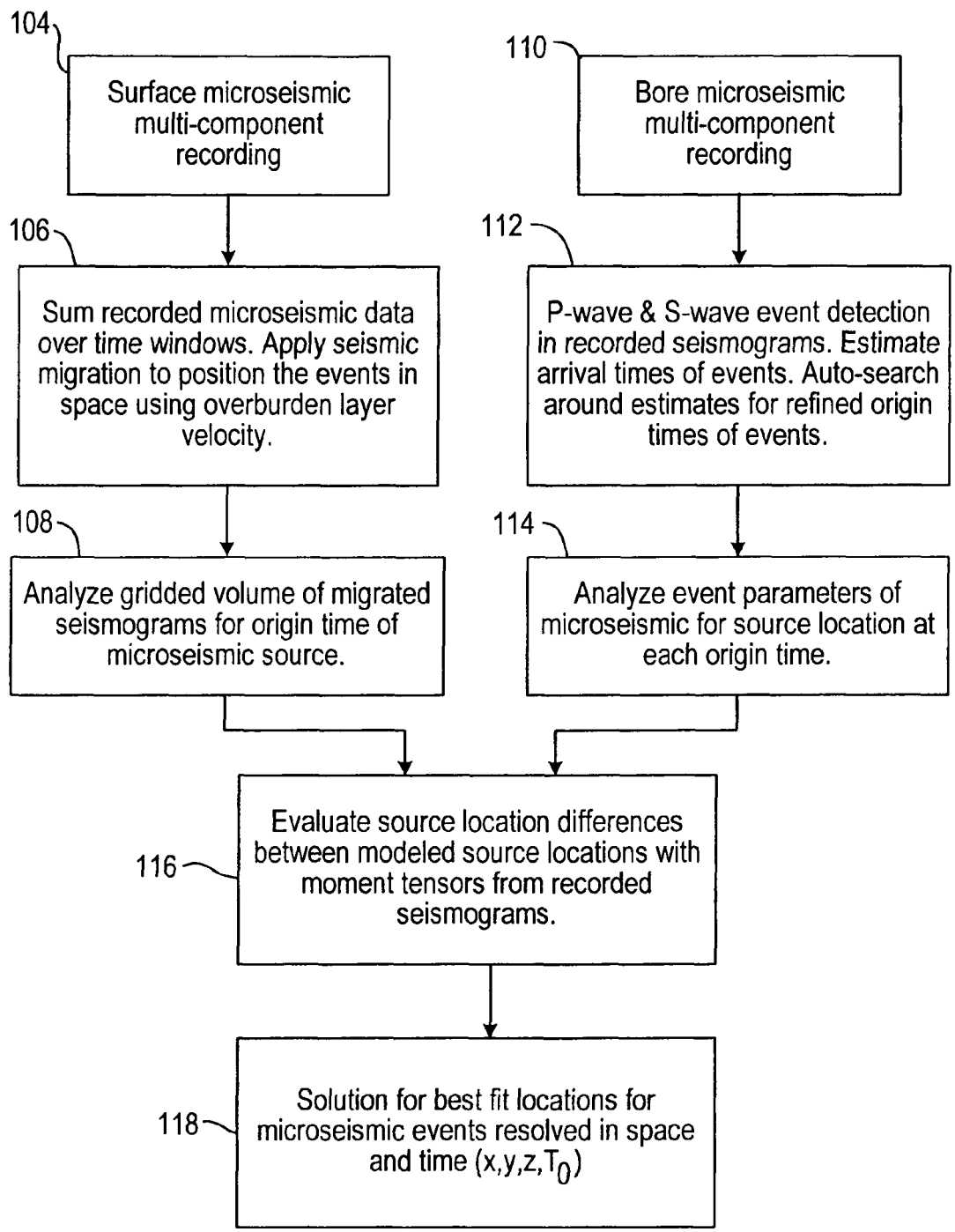
FIG. 11 is a schematic illustration of processing flow for microseismic data recorded on the surface and in levels in a borehole.

FIG. 11 illustrates a flowchart of processing flow for microseismic data recorded on the surface 22 and in levels in a borehole 11. The data processing procedure for each type of sensor 18, 20 performs a signal processing scheme followed by polarization analysis, and then computation of microseismic attributes related to the source in the reservoir 14. For the surface sensors 18, the data for the surface-sensor detected multi-component microseismic signal is recorded in step 104. Data pre-processing occurs in step 106 in which the sum of such recorded microseismic data is summed over time windows, and seismic migration analysis is applied to determine the position of the microseismic events in space using an overburden layer velocity method. The grid-based volume of migrated seismograms are analyzed in step 108 for determining the origin time of the microseismic source.

For the borehole sensors 20, the data for the borehole-sensor detected multi-component microseismic signal is recorded in step 110. Data pre-processing occurs in step 112 in which P-wave and S-wave events are detected in the recorded seismograms, arrival times of microseismic events is estimated, and an auto-search is performed around the estimates for refined origin times of the microseismic events. The event parameters of the microseismic events are analyzed in step 114 for determining the source location at each origin time of the microseismic event.

The method then processes in step 116 the results of the analysis steps 108, 114, in which source location differences is evaluated between modeled source locations with moment tensors from recorded seismograms. A best-fit solution for locations for the microseismic events is determined in step 118 with the locations being resolved in space and time (x, y, z, $T_O$) relative to the time of occurrence $T_O$ of the detected microseismic events.

Since the sensors 18, 20 are recorded in time synchronously, microseismic activity related to each event is recorded by all sensors 18, 20 and can be identified. Such redundancy in detecting of the events improves the confidence in locating their source. The spatial distribution provides increased aperture in measurement of the microseismic events.

Figure 12:
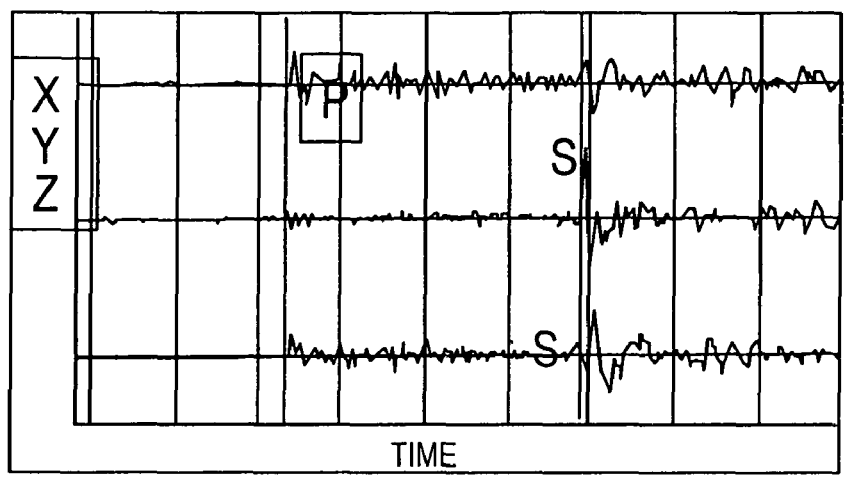
FIG. 12 is a graphic representation of the seismic data of shear slippage of reservoir rocks.
Figure 13:
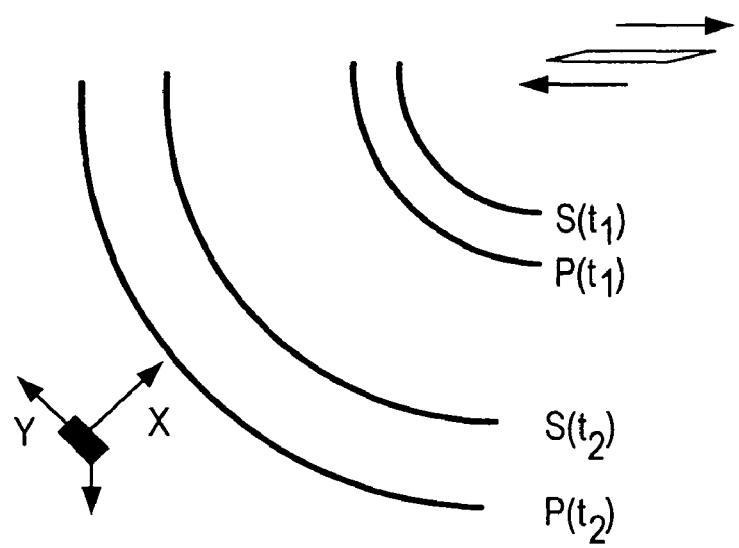
FIG. 13 is a schematic illustrating the shear slippages of reservoir rocks.

Generation of microseisms can be induced by the failure or shear-slippage by stress changes in reservoirs with perturbation caused by injection and production. FIG. 12 is a graphic representation of the seismic data of shear slippage of reservoir rocks, due to the flow of water being injected into the reservoir rocks to produce oil. Passive microseismic events are detected by the 3-component seismic sensors 18, 20 planted on the surface and in the borehole, with the time-dependent behavior of such P-waves and S-waves determining the shear slippages of reservoir rocks, as shown in FIG. 13. The locations of hypocenters 98 of the detected microseisms are resolved mathematically for mapping by the system 10, as shown in FIG. 9B, and provide a distribution of a zone weakness or fluid conduit path through which the reservoir fluids advance faster than through other areas in the reservoir volume.

By operating a fluid injection system shown, for example, in FIG. 2, controlled stimulation of the reservoir 14 is performed, in which cyclical injection of fluids in predetermined start-stop cycles occurs in the injection well 26 during a calibration procedure for the plurality of seismic sensors. The detected microseismic events from such controlled injection create a plurality of vertical seismic profiles (VSP) 120. Accordingly, predetermined locations and timing of the microseisms are processed for calibration of the sensors 18, 20 to orient data measurements gathered by the sensors 18, 20, such as the permanent 3-component sensors, to operate in the field during the typical reservoir production life. Azimuthal VSP data at different offsets with controlled surface vibroseis sources are used to orient the x, y components in the borehole and in test sensor couplings.

In conventional applications, such microseisms are only detected with borehole sensors 20 in a borehole 11. In the prior art, the restriction to only use borehole sensors 20 has limited the aperture or volumetric area that can be investigated. The present invention of the disclosed system 10 and method allows the mapping of fluid flow anisotropy over a reservoir volume, between and away from the wells. This information can also be applied to infer reservoir properties such as permeability and reservoir connectivity for numerical simulation of fluids, as shown in FIGS. 10A-10D. The result is increased accuracy in reservoir model descriptions and improved recovery of original oil in place.

The system 10 and method of the present invention permits three dimensional (3D) reservoir monitoring continuously and in real-time as the fluids are produced or extracted from and injected into the reservoir 14. The distributed network of permanent surface sensors 18 and permanent multi-level borehole sensors 20 in a single borehole 11 are used to acquire synchronized GPS time-stamped microseismic data. Universal time or GMT is obtained from at least one GPS satellite receiver 72 that is operatively connected to and/or in communication with recording device and processing systems described herein. The data from the entire network of sensors 18, 20 are recorded simultaneously in a central recording system. Each sensor 18, 20 in the network is surveyed for its (x, y, z) location, and the sensors 18, 20 are precisely orientated in the same configuration before cementing in place on the surface 22 or in the borehole 11. The orientation of the borehole sensors 20 is determined after the installation is complete. This is done by generating controlled seismic sources at measured azimuthal directions around the well, as described in connection with FIGS. 2 and 14. The detected first arrival microseismic signals from the known seismic azimuth source at each sensor 18, 20 is analyzed in order to determine its orientation.

Figure 14:
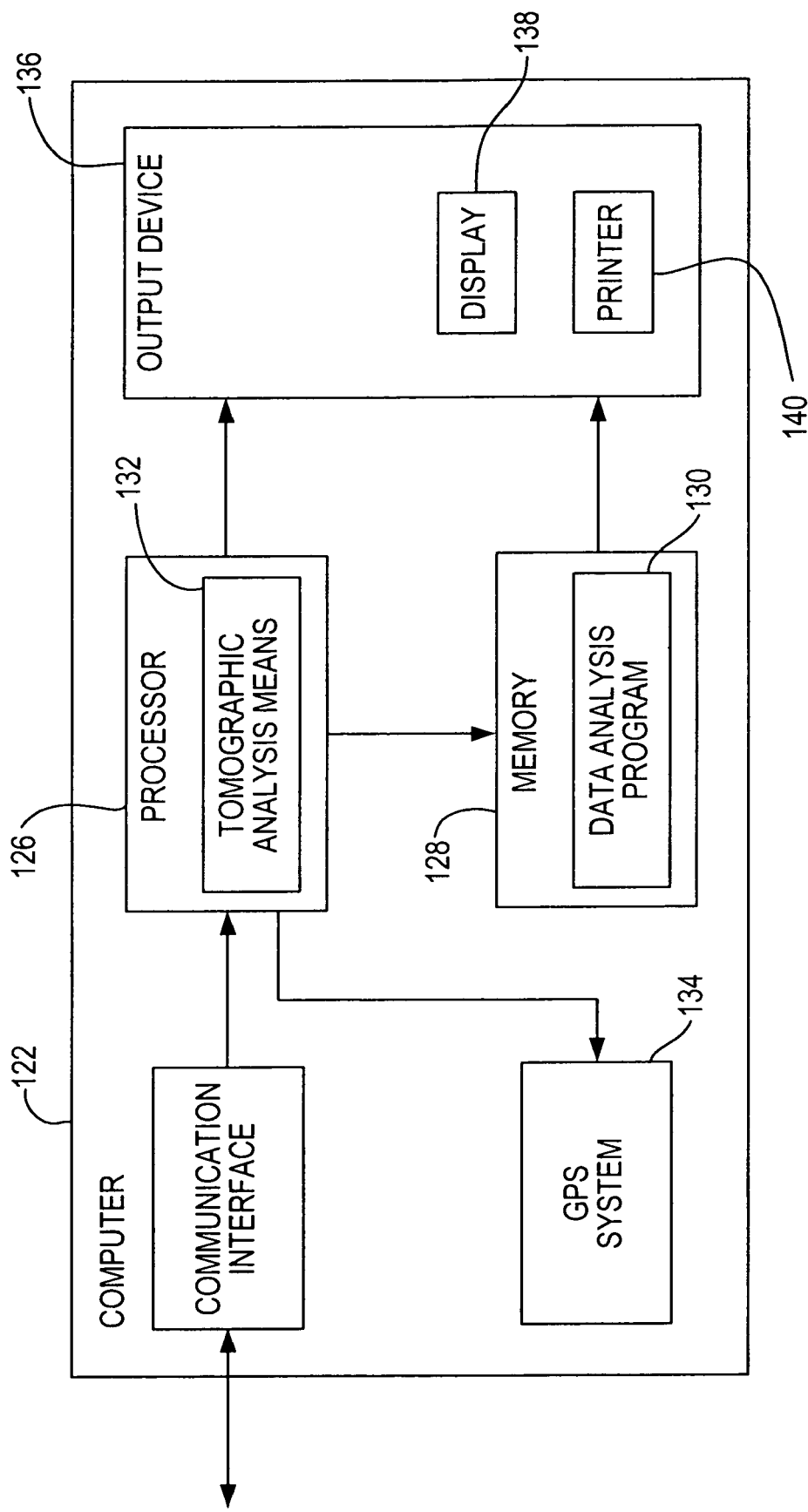
FIG. 14 is a schematic illustrating the components of a data processing computer used in the present invention.

From the 3-component borehole sensors 20, the microseismic data is gathered for processing by a computer 122 as shown, for example, in FIG. 14, which can implement the seismic server 62 in FIG. 1. A communication interface 124 connects to the "WIFI" communications devices 61, and the microseismic data is acquired by a processor 126 for storage in a memory 128, which can implement the data storage device 65. The processor 126 and memory 128 can be implemented by any known computing system, such as a microprocessor-based server or personal computer.

A data analysis program 130 is provided in the memory 128 and executed by the processor 126 for performing the operations, steps, and features of the system 10 and method described herein. For example, the processor 126 can include, as hardware and/or software, tomographic analysis means 132 known in the art for generating tomograms corresponding to the acquired microseismic data. The computer 122 can include or be connected to a GPS system 134, which can incorporate or be connected to the GPS system 72, for managing the received microseismic data according to location and time of acquisition.

The computer 122 can include and/or be connected to an output device 136 which can include a display 138 and/or a printer 140 or other known output devices, such as plotters. Once the system 10 has processed the microseismic data using the data analysis program 130 and/or the tomographic analysis means 132, with such microseismic data having been received at the processor 126 via the communications interface 124, the processor 126 can generate and output a graphical mapping of the detected hypocenters 98 and determined flow pathways 102, shown in FIG. 9B. The outputted mapping shown in FIG. 9B can be displayed to the user on the display 138 and/or can be printed on a printer 140 or plotted using a plotting device.

Using the computer 122 implementing the system 10 and method of the present invention, estimates of microseismic source or hypocenter location 98, such as shown in FIG. 9B, are made by picking the first arrival times of P-waves and S-waves events, or first breaks, from the recorded seismograms. Hodogram analysis, such as shown in FIG. 10D, provides the polarization direction of the P-waves and S-waves, and the velocity of the rocks obtained from other measurements in the area are used for tomographic inversion of the picked travel times to obtain the range for the source point of the microseismic event or the hypocenter 98.

The hypocenters 98 from all events emanating from the reservoir 14 are mapped spatially as shown in FIG. 9B to form a cluster of points of all the detected microseismic events. The events, however, are too weak to be detected on individual surface sensors 18. Records of seismic traces from a large number of surface receivers incorporating the sensors 18 are processed by stacking or adding their seismic energy over a recording time period after properly migrating or imaging the recorded amplitudes, as described in connection with step 106 in FIG. 11. For each microseismic event, a higher energy that is above the ambient noise floor is detected after stacking and migrating the data.

The hypocenter location is computed from a combination of events detected in the borehole sensors 20 and in the surface network of surface sensors 18. The magnitude of the microseismic event determines the relative amplitude of the seismic data. The stacking or summing of the amplitude value can represent the cumulative energy from several seismic events. A 3D volume of the cumulative energy over a period of recorded time is obtained that is integrated with the distribution of hypocenter clusters obtained from the borehole sensor recording. The smaller magnitude micro-earthquakes triggered by the fluid movement are more numerous and are most important for the monitoring of reservoir changes due to injection and production activities. Events are recorded simultaneously at all sensors in the acquisition system with a source-to-receiver delay from the initiation time of each event.

In order to attain optimum coupling and a high signal-to-noise ratio, the surface sensors 18 are buried approximately ten feet below the earth's surface and embedded in bentonite and cement grout. The borehole sensors 20 are either cemented or clamped in place at appropriate intervals in the well 12. Since these microseismic vibrations are extremely faint, physical coupling of the sensors 18, 20 to the formation and the accuracy of the geophones 28 in responding to three-component ground-particle motion are critical.

In the practice of the invention, a high density microseismic network is designed that uses the sensors 18, 20 spatially distributed on the ground surface 22 and in the borehole 11 at various levels in a monitor well 84, which can be a dedicated well for monitoring and/or can be a production well 12. Triaxial or 3-component geophones 28 capable of measuring artifact-free responses over a frequency range of 10 Hz to 500 Hz are employed. The sensor elements are oriented mutually orthogonally to each other. This ensures the detection of microseismic waves with particle motion in all orientations. The sensors 18, 20 detect microseismic source events 44 that generate microseismic emissions 55 which radiate from the rock-failure surface 16 and emanate from within the reservoir 14.

Fluid movements due to production and injection operations induce microseismic events that result from elastic failure of the reservoir rock matrix. The rock failure is due to shear stress release along zones of weakness in the reservoir. Such zones of weakness are present in abundance in a heterogeneous carbonate reservoir rock matrix such as limestone and dolomite. The stress release is due to perturbation caused by reservoir fluid production and injection operations.

The injection operations generate an increase in reservoir pore pressure which increases the shear stress and affects the stability along the planes of weakness in reservoir rocks such as joints, bedding planes, faults and fractures. Similarly, reservoir production operation or fluid withdrawal creates a pore pressure sink which affects the stability along the zones of weakness.

The present invention defines a technique for the mapping of preferential fluid movement directions in the reservoir 14. This information between the well locations cannot easily be measured in the prior art. The results of the present invention provide the orientation and distribution of preferential fluid pathways 102 such as faults shown in FIG. 9B. Such three-dimensional fluid pathways can improve reservoir management and optimize the efficiency of fluid injection and production operations.

The plurality of multi-component seismic sensors 18, 20 is deployed in a network grid pattern and is permanently cemented just below the ground surface 22, as shown in FIG. 1. Simultaneously, arrays of multi-component seismic borehole sensors 20 are placed at multiple levels in a vertical borehole 11. The borehole sensors 20 in the borehole 11 are also cemented or clamped in place to ensure good coupling with the formation layers, as shown in FIGS. 3, 3A and 3B. The combination of surface sensors 18 and borehole sensors 20 forms the total network for microseismic detection. The sensors 18, 20 continuously detect microseismic emissions 55, generated from microseismic source events 44, which emanate from the hydrocarbon reservoir 14 during the production life and operation of drilling to the hydrocarbon reservoir, as shown in FIG. 5. The sensors 18, 20 are connected to a plurality of remote transmission lines as the connectors 38, and to a digitizer processor and/or an analog-to-digital converter 68. Each sensor output is recorded on an individual channel in a multi-channel recorder, as shown in FIGS. 6-7. The recorded data traces are processed, as described herein.

Microseismic analysis techniques, which are well known in the industry, are adapted to integrate the high density measurements at the surface 22 with those made in the borehole 11 for the purpose of determining the microseismic events radiated from the source location. For each microseismic event, it is first necessary to determine the slip direction or source mechanism before analyzing for source parameters, shown in FIGS. 10A-10D.

The first arrival times of the compressional or P-waves and shear or S-waves from the source, measured at the sensors 18, 20 and the seismic wave velocity model from source to the sensors 18, 20 for P-waves and S-waves, are used for resolving the source locations using a tomographic technique performed by the tomographic analysis means 132. The difference between the arrival times of P-waves and S-waves provide the distance between the source and receiver locations. The direction of the microseismic source-to-receiver is inferred from the P-wave particle motion hodograms. The frequency spectrum of the recorded microseismic signals provides a measure of magnitude of the zone of shear slippage in the reservoir 14, as shown in FIGS. 10A-10D.

A field experiment was conducted over a producing oil field in Saudi Arabia to assess the feasibility of monitoring microseismic activity related to the subsurface reservoir at depth. Two shallow wells were drilled for the purpose and were instrumented with 3-component borehole sensors 20. Similar sensors 18 were also deployed in a spatial pattern on the ground surface 22. Simultaneous observations of the ambient microseismicity on the ground surface 22 and at various levels in the two boreholes 11 were made at the test site over several days. Using a velocity model developed from measurements at various wells drilled previously in the location and the laboratory analysis of the geomechanical properties of rock core samples, the microseismic emissions 55 emanating from the reservoir 14 were estimated. This data was compared with observed microseismicity at the network of sensors 18, 20.

Analysis of the results from the experiment indicates that the observed ambient noise levels in the pilot test area in Saudi Arabia are sufficiently low. This result also indicates that a microseismic network consisting of surface sensors 18 and borehole sensors 20 is able to detect extremely low intensity microseismic events with local magnitude $M_L<-2$ from the reservoir levels. The results also indicate that attenuation of recorded microseismic activities is very low, indicating a high Q factor. The low attenuation improves the prospect of detecting minute microseismic events 44 over long source-to-receiver travel paths. This makes the study area in Saudi Arabia an ideal location for the microseismic experiment.

In order to obtain the advantages of features in the present invention, a total network of a large number of surface 3-component sensors 18 in a spatial array, such as shown in FIG. 4, and borehole sensors 20 in a vertical array are installed, as shown in FIG. 1. These are permanently cemented in place for maximum coupling with the earth formations. The location of each sensor 18, 20 in 3D space is surveyed and the sensors 18, 20 are precisely oriented. All horizontal sensors are oriented in a common direction. All the sensors 18, 20 are connected to an electronic amplifier 66 and an analog-to-digital converter 68 or to a digitizer. This converts the detected analog vibrations or seismic emissions 55 to digital values that are recorded by a multi-channel data acquisition unit 70 or by the recording system. Each sensor 18, 20 is recorded in a specific channel of the multi-channel data acquisition unit 70 shown in FIG. 5.

The recorded data are sent in real-time via a dedicated "WIFI" wireless communication device 61. The continuous data acquisition unit is connected to a GPS receiver and clock 72 that time-stamps microseismic events 44 detected by each sensor 18, 20 shown in FIG. 5 with a standard time such as the Greenwich Mean Time (GMT) obtained from GPS satellites. The first arrival times of the P-wave and the S-wave are determined from the data records during data processing.

The recorded data are analyzed for the hodograms to compute the azimuth and dip for the seismic waves arriving at the sensors 18, 20. The hodograms are used to calculate the microseismic event source point or location of the hypocenter 98 by converting the time to depth using a velocity model for the area that is deduced from well measurements in the vicinity. The spectral frequency of the signal is used for estimation of the radius of rock failure and the polarity hodogram and relative amplitudes of the seismic signal components that indicates the orientation of the elastic deformation surface, shown in FIGS. 10A-10D.

The computation of location of microseismic sources is performed by techniques known in the art, such as known and commercially available computer software for such analysis. The location in (x, y, z) coordinates for each microseismic event 44 that is detected by the surface sensors 18 and the borehole sensors 20 is derived, and its time of occurrence $T_O$ is obtained from the GPS time stamp from the recording system. The plurality of sensors 18, 20 in a high density network provides the redundancy in the recorded data and improves the accuracy in the source location of the detected events.

The system 10 and method of the present invention include a network of a large number of high density microseismic sensors 18, 20 installed on the surface 22 and at various levels in the borehole 11. The network of sensors 18, 20 is calibrated by stimulating the reservoir thus inducing microseismic events as shown in FIG. 2. This is done by performing injector pulse tests which constitutes starting and stopping water injection in nearby injection wells 26, at predefined intervals, shown in FIG. 8. Explosive charges could also be detonated in a nearby well at predefined depth levels in the reservoir 14. The resulting shock waves are detected at the surface sensors 18 and borehole sensors 20 as seismic events with a delay time corresponding to the distance of each respective sensor 18, 20 from the source location.

As injected water displaces the oil that is extracted, the zones of weakness in the reservoir rocks such as joints and faults are perturbed, and a local microseismic event 44 is generated in the reservoir volume, as shown in FIG. 2. The reservoir volume is idealized to be composed of a large number of small equal-size cubes where the cubes represent the reservoir matrix. These cubes or grid blocks in this cellular model either contain a shear slippage with resulting microseismic activity or has no activity. When contiguous grid blocks contain microseismic events 44 generating microseismic emissions 55 emanating from within, such microseismic events are likely to be due to a system of fractures that have been temporarily or permanently displaced by the fluid flow from water injection or oil production. These cells with microseismic activities would therefore be interconnected to hydraulic flow and would constitute fluid flow pathways 102 along these preferential directions, such as faults, shown in FIG. 9B. Grid blocks having no microseismic activity are the reservoir zones with no preferential fluid flow directions or isotropic flow shown in FIG. 1.

By continuously interrogating all the cells in the reservoir volume for recorded microseismic activities in the sensors 18, 20 deployed in the borehole 11 and those spatially deployed on the ground surface 22, an estimate of the flow anisotropy and permeability can be made empirically. The network of microseismic events forms a conductivity network that could serve as input for reservoir simulation in order to compute fluid flow through such network.

The microseismic emissions from the reservoir 14 are calibrated by correlating with induced activity in the reservoir 14. The rates of fluid injection and production in the reservoir 14 are varied or "pulsed" at the well locations and their effects on detection and recording of microseismicity in the monitor well 84, and the surface sensors 18 are monitored as shown in FIG. 2. The microseismicity detected above the ambient noise threshold due to such controlled pulsing of reservoir provides a correlation with the reservoir pressure and flow rate. The processed microseismic attributes also need to be correlated with the spatial distribution of surface sensors 18 and the vertically oriented borehole sensors 20 in the monitor well 84.

The processing of the microseismic system 10 consists of the signal processing of recorded seismograms collected from the surface 22 and the borehole sensors 20, and integrating the results of the total system. The surface data is summed over time windows, the recorded seismic energy in the data is migrated using a velocity model in the area of study and epicenters locations for the microseismic events and their recorded time of occurrence is corrected. These epicenters of microseismic events are related to the hypocenters 98 of events derived from processing of the microseismic recording in the borehole sensors 20. The time synchronous events for the hypocenters 98 located in the reservoir depths for the two sensor systems of the surface sensors 18 and borehole sensors 20 are matched for interpretation of shear slippage in the zones of weakness in reservoir rocks. This shear slippage is due to perturbation of the reservoir fluids by injection and production operations. Thus, a mapping of such shear slippage and faults which serve as fluid pathways 102, such as shown in FIG. 9B, is generated and output to the user by the discloses system 10 and method.

While the preferred embodiments of the present invention have been shown and described herein, it will be obvious that each such embodiment is provided by way of example only. Numerous variations, changes and substitutions will occur to those skilled in the art without departing from the invention disclosed. Accordingly, it is intended that the invention be limited only by the spirit and scope of the appended claims.

I claim:

1. A system for monitoring fluid pathways in a producing hydrocarbon reservoir of the type in which injected water replaces extracted oil, thereby generating passive microseismic events, wherein the reservoir includes at least one borehole associated with the reservoir, the system comprising:
a first sensor array comprising a number of 3-component seismic sensors physically secured to the ground within a sensor area surrounding the borehole;
a second sensor array comprising a number of 3-component seismic sensors installed permanently at various levels in the well borehole; and
a computer coupled to each of said seismic sensors for receiving signals detected by said seismic sensors, wherein said computer is programmed to apply a predetermined data analysis program to signals representing microseismic data corresponding only to passive microseismic events due to production activities, for determining and outputting a mapping of failure surfaces which define pathways for preferential fluid movement in the reservoir;
wherein the size of said sensor area, and the number of sensors contained in said sensor area, together with the number and spacing of sensors in said second sensor array, are sufficient to provide meaningful passive microseismic data to said computer.

2. The system of claim 1, wherein said first array constitutes at least about 50 seismic sensors buried below the ground surface.

3. The system of claim 1, wherein said second array comprises a first plurality of 3-component seismic sensors located within the reservoir and a second plurality of 3-component seismic sensors located above the reservoir.

4. The system of claim 2, wherein said second, vertical array comprises a first plurality of seismic sensors located within the reservoir and a second plurality of seismic sensors located above the reservoir.

5. The system of claim 1, further comprising a high precision Global Positioning System (GPS) clock time measurement system, wherein said computer uses said time measurement system to store signals from said seismic sensors which are detected simultaneously by said seismic sensors.

6. The system of claim 1, wherein the computer processes the microseismic data for determining the locations of the sources of the microseisms associated with the detected microseismic events.

7. The system of claim 1, wherein the computer compares the detected pathways for preferential fluid movement in the reservoir with predetermined computational models of the pathways.

8. The system of claim 1, wherein the computer performs microseismic event detection of compressional P-waves and shear S-waves, determines a delay time for the first arrival of the P- waves and S-waves, and determines a polarization of the P-waves and S-waves for determining the azimuthal direction thereof.

9. The system of claim 8, wherein the computer contains programming for generating tomograms using the velocity of the P-waves and S-waves for determining the range of the P-waves and S-waves and for imaging the resulting source locations of all detected microseismic events.

10. The system of claim 9, wherein the computer maps the fluid pathways for reservoir flow anisotropy over reservoir production time from the images of the source locations.

11. A method for the monitoring fluid pathways in a producing hydrocarbon reservoir of the type in which injected water replaces extracted oil, thereby generating passive mocroseismic events, the method comprising the steps of:
providing a number of 3-component seismic sensors secured to the ground in a first array within a sensor area surrounding a borehole associated with the reservoir;
providing a number of 3-component seismic sensors installed permanently at various levels in the well borehole in a second, vertical array;
detecting emission signals emitted by microseismic events using said seismic sensors;
generating microseismic data corresponding only to passive microseismic events;
processing the passive microseismic data using a computer to apply a predetermined data analysis program;
determining a mapping of failure surfaces which define pathways for preferential fluid movement in the reservoir; and
outputting the mapping through an output device
wherein the size of said sensor area, and the number of sensors contained in said sensor area, together with the number and spacing of sensors in said second sensor array, are sufficient to provide meaningful passive microseismic data to said computer.

12. The method of claim 11, wherein said first array constitutes at least about 50 seismic sensors buried below the ground surface.

13. The system of claim 11, wherein said second, vertical array comprises a first plurality of seismic sensors located within the reservoir and a second plurality of seismic sensors located above the reservoir.

14. The method of claim 11, wherein the step of detecting includes:
generating passive microseismic data detected simultaneously by said seismic sensors using a high precision Global Positioning System (GPS) clock time measurement system.

15. The method of claim 11, further comprising the step of:
processing the microseismic data for determining the locations of the sources of the microseisms associated with the detected microseismic events.

16. The method of claim 11, further comprising the step of:
comparing the detected pathways for preferential fluid movement in the reservoir with predetermined computational models of the pathways.

17. The method of claim 11, further comprising the steps of:
performing microseismic event detection of compressional P-waves and shear S-waves;
determining a delay time for the first arrival of the P-waves and S-waves; and
determining a polarization of the P-waves and S-waves for determining the azimuthal direction thereof.

18. The method of claim 17, further comprising the steps of:
performing tomographic analysis for generating tomograms using the velocity of the P-waves and S-waves;
determining the range of the P-waves and S-waves; and
imaging the resulting source locations of all detected microseismic events.

* * * * *

UNITED STATES PATENT AND TRADEMARK OFFICE
CERTIFICATE OF CORRECTION

PATENT NO. : 8,041,510 B2
APPLICATION NO. : 12/083715
DATED : October 18, 2011
INVENTOR(S) : Shivaji N. Dasgupta Page 1 of 1

It is certified that error appears in the above-identified patent and that said Letters Patent is hereby corrected as shown below:

On the Title page, add:

Related U.S. Application Data

Item (60) Provisional application No. 60/734,028, filed on Nov. 3, 2005; provisional application No. 60/808,191, filed on May 23, 2006

Signed and Sealed this
Thirteenth Day of December, 2011

David J. Kappos
*Director of the United States Patent and Trademark Office*